US010853772B2

(12) United States Patent
Madisetti et al.

(10) Patent No.: US 10,853,772 B2
(45) Date of Patent: Dec. 1, 2020

(54) METHOD AND SYSTEM FOR EXCHANGE OF VALUE OR TOKENS BETWEEN BLOCKCHAIN NETWORKS

(71) Applicants: Vijay K. Madisetti, Johns Creek, GA (US); Arshdeep Bahga, Chandigarh (IN)

(72) Inventors: Vijay K. Madisetti, Johns Creek, GA (US); Arshdeep Bahga, Chandigarh (IN)

( * ) Notice: Subject to any disclaimer, the term of this patent is extended or adjusted under 35 U.S.C. 154(b) by 0 days.

(21) Appl. No.: 15/976,910

(22) Filed: May 11, 2018

(65) Prior Publication Data
US 2019/0311337 A1    Oct. 10, 2019

Related U.S. Application Data

(60) Provisional application No. 62/652,341, filed on Apr. 4, 2018.

(51) Int. Cl.
*G06Q 20/06*    (2012.01)
*G06Q 20/38*    (2012.01)

(52) U.S. Cl.
CPC ..... *G06Q 20/0658* (2013.01); *G06Q 20/3823* (2013.01); *G06Q 20/3825* (2013.01);
(Continued)

(58) Field of Classification Search
CPC ......... G06Q 20/0658; G06Q 20/38215; G06Q 20/3823; G06Q 20/3825; G06Q 20/3829; G06Q 2220/00
(Continued)

(56) References Cited

U.S. PATENT DOCUMENTS 7,093,129 B1 *    8/2006    Gavagni ............. H04L 63/0428
                                                           379/67.1
8,332,322 B2    12/2012    Varga
(Continued)

FOREIGN PATENT DOCUMENTS

WO    2018109260 A1    6/2018

OTHER PUBLICATIONS

Shapeshift (taken from https://info.shapeshift.io/ and downloaded from https://web.archive.org/web/20170421095128/https://info.shapeshift.io/#api-5, screen shots attached in prior office action as PDF file). (Year: 2017).*

(Continued)

*Primary Examiner* — James D Nigh
*Assistant Examiner* — Margaret M Neubig
(74) *Attorney, Agent, or Firm* — Daniel C. Pierron; Widerman Malek PL

(57) ABSTRACT

A blockchain value transfer method comprising receiving from a client a transfer request to transfer value in a form of at least one of a cryptocurrency and a token, determining if the transfer request is intra-chain or inter-chain, intra-chain defining a combined sending and receiving blockchain network and inter-chain defining a sending blockchain network and a receiving blockchain network, transmitting to the client a response to the transfer request, the response comprising a raw transaction, receiving from the client a response to the raw transaction wherein a private key of a user is used to sign the raw transaction, defining a signed transaction, verifying a signature of the signed transaction and broadcasting the signed transaction to the combined sending and receiving blockchain network if the transaction request is intra-chain or to each of the sending blockchain network and the receiving blockchain network if the transaction request is inter-chain.

19 Claims, 16 Drawing Sheets

(52) U.S. Cl.
CPC ... *G06Q 20/3829* (2013.01); *G06Q 20/38215* (2013.01); *G06Q 2220/00* (2013.01)

(58) Field of Classification Search
USPC .................................................. 705/50–79
See application file for complete search history.

(56) References Cited

U.S. PATENT DOCUMENTS

| | | | |
|---|---|---|---|
| 10,097,356 B2* | 10/2018 | Zinder | G06F 21/6254 |
| 10,318,956 B2 | 6/2019 | Shah et al. | |
| 10,438,920 B2 | 10/2019 | Winklevoss et al. | |
| 2010/0299731 A1* | 11/2010 | Atkinson | G06F 21/42 726/6 |
| 2015/0262140 A1* | 9/2015 | Armstrong | G06Q 20/0658 705/41 |
| 2015/0262172 A1 | 9/2015 | Rebernik | |
| 2015/0319173 A1 | 11/2015 | Hu et al. | |
| 2015/0332256 A1 | 11/2015 | Minor | |
| 2015/0363785 A1 | 12/2015 | Perez et al. | |
| 2016/0092297 A1 | 3/2016 | Mazon | |
| 2016/0239571 A1 | 8/2016 | Rowe et al. | |
| 2016/0330027 A1* | 11/2016 | Ebrahimi | H04L 9/0637 |
| 2016/0342977 A1* | 11/2016 | Lam | G06Q 20/0658 |
| 2017/0155675 A1* | 6/2017 | Howe | H04L 63/1425 |
| 2017/0293898 A1 | 10/2017 | Rampton | |
| 2017/0364701 A1 | 12/2017 | Struttmann | |
| 2018/0041479 A1* | 2/2018 | Wang | H04W 12/001 |
| 2018/0068282 A1 | 3/2018 | Patel et al. | |
| 2018/0143979 A1 | 5/2018 | Garbinato et al. | |
| 2018/0227119 A1 | 8/2018 | Bibera et al. | |
| 2018/0227131 A1 | 8/2018 | Ebrahimi et al. | |
| 2018/0247376 A1* | 8/2018 | Sharma | G06F 16/27 |
| 2018/0309567 A1* | 10/2018 | Wooden | H04L 9/3239 |
| 2019/0188706 A1 | 6/2019 | McCurtis | |
| 2019/0220854 A1* | 7/2019 | Pesci | G06Q 20/381 |
| 2019/0303886 A1 | 10/2019 | Kikinis | |

OTHER PUBLICATIONS

Schneier (Applied Cryptography, 1996, cited pages previously attached as PDF file), (Year: 1996).*
Shapeshift7 (taken from https://info.shapeshift.io/ and downloaded from https://web.archive.org/web/20170421095128/https://info.shapeshift.io/#api-5, newly attached as improved-quality PDF file) (Year: 2017).*
Demartino, ("Litecoin Joins Ether and Bitcoin in Shapeshift Revival", dated Apr. 22, 2016, downloaded from https://coinjournal.net/litecoin-joins-shapeshift-revival/ and attached previously as a PDF file), (Year: 2016).*
Madeira, ("What is Shapeshift and How to Use It", dated Oct. 17, 2016, downloaded from https://www.cryptocompare.com/exchanges/guides/what-is-shapeshift/ and attached previously as PDF file). (Year: 2016).*
Schneier (Applied Cryptography, 1996, cited pages attached previously as PDF file) (Year: 1996).*
"Shapeshift", taken from https://info.shapeshift.io/ and downloaded from https://web.archive.org/web/20170421095128/https://info.shapeshift.io/#api-5, attached as PDF file (Year: 2017).*
Demartino, "Litcoin Joins Ether&Bitcoin in Shapeshift Revival", downloaded from https://coinjournal.net/litecoin-joins-shapeshift-revival/; attached as a PDF file (Year: 2016).*
Madeira, "What is Shapshift and How to Use It", downloaded from https://www.cryptocompare.com/exchanges/guides/what-is-shapeshift/ , attached as PDF file (Year: 2016).*
Schneier (Applied Cryptography, 1996, cited pages attached as PDF file), (Year: 1996).*
"Inside ShapeShift's Cryptocurrency Exchange," dated 2014, downloaded from https://www.coindesk.com/inside-shapeshifts-cryptocurrency-exchange-login-required and attached as a PDF file.) (Year: 2014).*
"How does Shapeshift work differently from other altcoin exchanges?", (dated Mar. 12, 2017, downloaded from https://bitcointalk.org/index.php?topic=1823673.0 and attached as a PDF file), (Year: 2017).*
Jay Huang—United States Patent and Trademark Office, Non-Final Office Action, U.S. Appl. No. 16/567,042, dated Nov. 15, 2019.
Non-Final Office action re U.S. Appl. No. 16/396,845, United States Patent and Trademark Office, dated Nov. 1, 2019.
CCN, "Introducing Xrouter. Developers Can Now Mix and Match Any Blockchain via The World's First Blockchain Router", https://www.ccn.com/introducing-xrouter-developers-can-now-mix-and-match-any-blockchain-via-the-worlds-first-blockchain-router/, All Relevant.
Korean Intellectual Property Office—BYUN Sung Cheal, Patent Cooperation Treaty International Search Report, Application No. PCT/US2020/017835, dated Jun. 18, 2020.
Huang, Jay—United States Patent and Trademark Office, Final Office Action, U.S. Appl. No. 16/567,042, dated May 27, 2020.
Margaret M Neubig—United States Patent and Trademark Office, Final Office Action, U.S. Appl. No. 16/744,231 dated Aug. 31, 2020.

* cited by examiner

| Command | Purpose |
|---|---|
| GET | Retrieve information about an account, contract, transaction, exchange rate for a token |
| SEND | Send value from one account to another account in same network |
| XSEND | Send value from one account to another account in another network |
| REQUEST | Request value from an account in the same network |
| XREQUEST | Request value from an account in another network |
| RESPOND | Accept or deny a request received from an account in the same network |
| XRESPOND | Accept or deny a request received from an account in the another network |
| SIGN | Sign and approve a transaction |

FIG. 8

| Status Code | Purpose |
|---|---|
| 1xx | Request Received - For information purpose. E.g. A value transfer request is received and is being processed. |
| 2xx | Request Completed - The requested action has been successfully completed |
| 3xx | Request Pending - The VTTP command has been accepted, but the requested action is being held in abeyance, pending receipt of further information |
| 4xx | Client Error - The VTTP command was not accepted due to a client error and the requested action did not take place. |
| 5xx | Server Error - The VTTP command was not accepted due to a server error and the requested action did not take place. |

FIG. 16

METHOD AND SYSTEM FOR EXCHANGE OF VALUE OR TOKENS BETWEEN BLOCKCHAIN NETWORKS

RELATED APPLICATIONS

This application claims the benefit under 35 U.S.C. § 119(e) of U.S. Provisional Patent Application Ser. No. 62/652,341 filed on Apr. 4, 2018 and titled Value Token Transfer Protocol—VTTP, the entire content of which is incorporated herein by reference.

FIELD OF THE INVENTION

The present invention relates to Value Token Transfer Protocol (VTTP), a protocol for exchange of value or tokens within and between blockchain networks.

BACKGROUND

Blockchain is a distributed and public ledger which maintains records of all the transactions. A blockchain network is a truly peer-to-peer network and it does not require a trusted central authority or intermediaries to authenticate or to settle the transactions or to control the network infrastructure. Users can interact and transact with the blockchain networks through Externally Owned Account (EOAs), which are owned and controlled by the users. Each EOA has a balance (in certain units of a Cryptocurrency associated with the Blockchain network) associated with it. EOAs do not have any associated code. All transactions on a blockchain network are initiated by EOAs. These accounts can send transactions to other EOAs or contract accounts. Another type of accounts support by second generation programmable Blockchain platforms are the Contract Accounts. A Contract Account is created and owned by an EOA and is controlled by the associated contract code which is stored with the account. The contract code execution is triggered by transactions sent by EOAs or messages sent by other contracts.

Blockchain networks can either be public or private. Public blockchain networks are free and open to all and any user can create an account and participate in the consensus mechanism on a public blockchain and view all the transactions on the network. Private blockchain networks are usually controlled and operated by a single organization and the transactions can be viewed only by the users within the organization. Public blockchain networks are usually unpermissioned or permissionless, as any node can participate in consensus process. Some public blockchain networks adopt a permissioned model where the consensus process is controlled by a pre-selected set of nodes. Private blockchain networks usually adopt the permissioned model. While public blockchain networks can be considered as fully decentralized, private blockchain networks are partially decentralized.

Organizations can have multiple private blockchain networks where each network is dedicated to a specific use case or department or business vertical. The blockchain networks within an organization may be created either using the same blockchain platform or technology or with different platforms or technologies.

On each blockchain network, a user can create multiple Externally Owned Accounts (EOAs). Each Externally Owned Account (EOA) has a public-private keypair associated with it. The account address is derived from the public key. When a new EOA is created, a keyfile is created which has the public and private keys associated with the account. The private key is encrypted with the password which is provided while creating the account. For sending transactions to other accounts, the private key and the account password are required.

This background information is provided to reveal information believed by the applicant to be of possible relevance to the present invention. No admission is necessarily intended, nor should be construed, that any of the preceding information constitutes prior art against the present invention.

SUMMARY OF THE INVENTION

With the above in mind, embodiments of the present invention are directed to a system and associated methods for exchange of value or tokens within and between blockchain networks.

In some embodiments, the method may further comprise a Value Token Transfer Protocol (VTTP) that provides the following features:

Intra-chain value transfer of native cryptocurrency (e.g. ETH on Ethereum blockchain);

Intra-chain value transfer of ERC20 tokens (e.g. sending OMG tokens and receiving SNT tokens);

Inter-chain value transfer of cryptocurrencies (e.g. Send ETH from Ethereum blockchain and receive LTC on Litecoin blockchain);

Intra and Inter-chain exchange of cryptocurrencies and ERC20 tokens (e.g. send BAT token from Ethereum blockchain and receive LTC on Litecoin blockchain); and Retrieve information on accounts, contracts, transactions for all participating blockchain networks.

In some embodiments, the method may further comprise client-server model in which VTTP works as a request-response protocol based on a client-server architecture, where a VTTP Client sends requests to a VTTP Server, and the server responds to the requests.

In some embodiments, the method may further comprise a peer-to-peer model in which VTTP works as a peer-to-peer protocol where VTTP Peers communicate directly with their peers and a VTTP Coordinator may be used for coordinating the communication between peers.

VTTP is blockchain platform or network independent. VTTP can be used to send any type of tokens between different blockchain networks or within a blockchain network, as long as the VTTP client and server know how to interpret and transfer tokens.

VTTP is a stateless protocol. Each VTTP request contains all the information required to process a request. VTTP client and server do not maintain state between successive requests.

Embodiments of the invention may be directed to A blockchain value transfer method comprising receiving from a client a request to transfer value in a form of at least one of a cryptocurrency and a token, defining a transfer request, determining if the transfer request is intra-chain or inter-chain, intra-chain defining a combined sending and receiving blockchain network and inter-chain defining a sending blockchain network and a receiving blockchain network, transmitting to the client a response to the transfer request, the response comprising a raw transaction, the raw transaction being intra-chain if the transfer request is intra-chain and inter-chain if the transfer request is inter-chain, receiving from the client a response to the raw transaction wherein a private key of a user is used to sign the raw transaction, defining a signed transaction, the signed transaction being intra-chain if the raw transaction is intra-chain and inter-chain if the raw transaction is inter-chain, verifying a signature of the signed transaction, and broadcasting the signed transaction to the combined sending and receiving blockchain network if the signed transaction is intra-chain or to each of the sending blockchain network and the receiving blockchain network if the signed transaction is inter-chain.

In some embodiments, the transfer request may comprise an identification of the sending blockchain network, an indication of the receiving blockchain network, and a value indication. Additionally, the indication of the receiving blockchain network may be an identification of a receiving blockchain network other than the blockchain network identified as the sending blockchain network for an inter-chain request and an absence of identification of a receiving blockchain network for an intra-chain request.

In some embodiments, verifying the signature of the signed transaction may comprise receiving verification of the signature of the signed transaction from a user identity and access management blockchain network.

In some embodiments, client credentials may be stored on a client credential database and the method may further comprise authenticating the client by an authentication process. The authentication process may comprise receiving an authentication request comprising an encrypted authentication string from the client, decrypting the encrypted authentication string to extract extracted client credentials, verifying the extracted client credentials within the client credential database, generating an authentication token responsive to the client credentials, and transmitting the authentication token to the client. The method may further comprise determining the extracted client credentials require two-factor authentication, transmitting to the client an indication the extracted client credentials require two-factor authentication, receiving a second authentication request comprising a second encrypted authentication string and a two-factor authentication token, decrypting the second encrypted authentication string from the second authentication request to extract a second extracted client credentials, and verifying each of the second extracted client credentials and the two-factor authentication token within the client credential database.

In some embodiments, the transfer request may be a multisignature transfer request. The raw transaction may be a multisignature raw transaction. A plurality of multisignature raw transactions may be stored and accessible on a multisignature raw transaction database, and each multisignature raw transaction stored on the multisignature raw transaction database may comprise a transaction identification (ID). The method may further comprise receiving a transfer request comprising a received transaction ID from a requestor, identifying at least one multisignature raw transaction stored in the multisignature raw transaction database having a transaction ID matching the received transaction ID, defining an identified multisignature raw transaction, transmitting the identified multisignature raw transaction to the requestor, receiving a response to the identified multisignature raw transaction wherein a private key of a user is used to sign the identified multisignature raw transaction, defining a signed identified multisignature raw transaction, and verifying a second signature of the signed identified multisignature raw transaction.

In some embodiments, the signed transaction may not be broadcasted to the receiving blockchain network prior to a value transfer from an account on the sending blockchain network is confirmed. The method may further comprise receiving a value transfer from an account on the sending blockchain network, sending the content of the value transfer to an exchange, receiving an exchanged value transfer from the exchange, and transmitting the exchanged value transfer to an account on the receiving blockchain network.

In some embodiments, the method may further comprise receiving a handshake initiating transmission from the client, transmitting a response to the handshake initiating transmission to the client, the response comprising a server certificate, receiving a reply transmission from the client comprising a random data string, the transmission being encrypted with a server public key, decrypting the reply transmission from the client using a server private key, extracting the random data string from the reply transmission, calculating a symmetric key from the random data string, receiving a finish transmission from the client indicating the client has calculated the symmetric key, and transmitting a finish transmission to the client indicating calculation of the symmetric key. The transmission transmitted to the client in response to the transfer request is encrypted with the symmetric key. Each of the request to transfer value and the response to the raw transaction received from the client may be encrypted with and decryptable using the symmetric key.

In some embodiments, the method may further comprise executing a smart contract responsive to the transfer request.

A further embodiment of the invention may be directed to a blockchain value transfer method comprising receiving from a client a request to transfer value in a form of at least one of a cryptocurrency and a token, defining a transfer request, determining a combined sending and receiving blockchain network associated with the transfer request, transmitting to the client a response to the transfer request, the response comprising a raw transaction, receiving from the client a response to the raw transaction wherein a private key of a user is used to sign the raw transaction, defining a signed transaction, verifying a signature of the signed transaction, and broadcasting the signed transaction to the combined sending and receiving blockchain network.

In some embodiments, verifying the signature of the signed transaction may comprise receiving verification of the signature of the signed transaction from a user identity and access management blockchain network.

In some embodiments, client credentials are stored on a client credential database. The method may further comprise authenticating the client by an authentication process. The authentication process may comprise receiving an authentication request comprising an encrypted authentication string from the client, decrypting the encrypted authentication string to extract extracted client credentials, verifying the extracted client credentials within the client credential database, generating an authentication token responsive to the client credentials, and transmitting the authentication token to the client. Additionally, the method may further comprise determining the extracted client credentials require two-factor authentication, transmitting to the client an indication the extracted client credentials require two-factor authentication, receiving a second authentication request comprising a second encrypted authentication string and a two-factor authentication token, decrypting the second encrypted authentication string from the second authentication request to extract a second extracted client credentials, and verifying each of the second extracted client credentials and the two-factor authentication token within the client credential database.

In some embodiments, the transfer request is a multisignature transfer request, the raw transaction is a multisignature raw transaction, and a plurality of multisignature raw transactions is stored and accessible on a multisignature raw transaction database, each multisignature raw transaction stored on the multisignature raw transaction database comprising a transaction identification (ID). The method may further comprise receiving a transfer request comprising a received transaction ID from a requestor, identifying at least one multisignature raw transaction stored in the multisignature raw transaction database having a transaction ID matching the received transaction ID, defining an identified multisignature raw transaction, transmitting the identified multisignature raw transaction to the requestor, receiving a response to the identified multisignature raw transaction wherein a private key of a user is used to sign the identified multisignature raw transaction, defining a signed identified multisignature raw transaction, and verifying a second signature of the signed identified multisignature raw transaction.

In some embodiments, the method according may further comprise receiving a handshake initiating transmission from the client, transmitting a response to the handshake initiating transmission to the client, the response comprising a server certificate, receiving a reply transmission from the client comprising a random data string, the transmission being encrypted with a server public key, decrypting the reply transmission from the client using the server public key, extracting the random data string from the reply transmission, calculating a symmetric key from the random data string, receiving a finish transmission from the client indicating the client has calculated the symmetric key, and transmitting a finish transmission to the client indicating calculation of the symmetric key. The transmission transmitted to the client in response to the transfer request is encrypted with the symmetric key, and each of the request to transfer value and the response to the raw transaction received from the client may be encrypted with and decryptable using the symmetric key.

In some embodiments, the method may further comprise executing a smart contract responsive to the transfer request. The smart contract could execute code that may implement additional security, data analytics or even AI (artificial intelligence) functionality using, but not limited to, information in the request to help facilitate appropriate response to requests.

A further embodiment of the invention may be directed to a system for executing blockchain value transfers comprising a processor, a data store positioned in communication with the processor, and a network communication device positioned in communication with each of the processor, the data store, and a network. The network communication device may be operable to receive from a client a request to transfer value in a form of at least one of a cryptocurrency and a token, defining a transfer request. The processor may be operable to determine if the transfer request is intra-chain or inter-chain, intra-chain defining a combined sending and receiving blockchain network and inter-chain defining a sending blockchain network and a receiving blockchain network. The network communication device may be operable to transmit to the client a response to the transfer request, the response comprising a raw transaction, the raw transaction being intra-chain if the transfer request is intra-chain and inter-chain if the transfer request is inter-chain, and further operable to receive from the client a response to the raw transaction wherein a private key of a user is used to sign the raw transaction, defining a signed transaction, the signed transaction being intra-chain if the raw transaction is intra-chain and inter-chain if the raw transaction is inter-chain. The processor may be operable to verify a signature of the signed transaction. The network communication device may be operable to broadcast the signed transaction to the combined sending and receiving blockchain network if the signed transaction is intra-chain or to each of the sending blockchain network and the receiving blockchain network if the signed transaction is inter-chain.

In some embodiments, the system may further comprise a plurality of multisignature raw transactions are stored on a multisignature raw transaction database. The transfer request may be a multisignature transfer request, and the raw transaction may be a multisignature raw transaction. Each multisignature raw transaction stored on the multisignature raw transaction database may comprise a transaction identification (ID). The network communication device may be operable to receive a transfer request comprising a received transaction ID from a requestor. The processor may be operable to identify at least one multisignature raw transaction stored in the multisignature raw transaction database having a transaction ID matching the received transaction ID, defining an identified multisignature raw transaction. The network communication device may be operable to transmit the identified multisignature raw transaction to the requestor and further operable to receive a response to the identified multisignature raw transaction wherein a private key of a user is used to sign the identified multisignature raw transaction, defining a signed identified multisignature raw transaction. The processor may be operable to verify a second signature of the signed identified multisignature raw transaction.

In some embodiments, the network communication device may be operable to not broadcast the signed transaction to the receiving blockchain network prior to a value transfer from an account on the sending blockchain network is confirmed. Additionally, the network communication device may be operable to receive a value transfer from an account on the sending blockchain network and further operable to send the content of the value transfer to an exchange. Furthermore, the network communication device may be operable to send an exchanged value transfer from the exchange and to transmit the exchanged value transfer to an account on the receiving blockchain network.

BRIEF DESCRIPTION OF THE DRAWINGS

FIG. 8 is an illustration the VTTP commands, according to an embodiment of the invention.

FIG. 16 is an illustration of VTTP status codes, according to an embodiment of the invention.

DETAILED DESCRIPTION OF THE INVENTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Those of ordinary skill in the art realize that the following descriptions of the embodiments of the present invention are illustrative and are not intended to be limiting in any way. Other embodiments of the present invention will readily suggest themselves to such skilled persons having the benefit of this disclosure. Like numbers refer to like elements throughout.

Although the following detailed description contains many specifics for the purposes of illustration, anyone of ordinary skill in the art will appreciate that many variations and alterations to the following details are within the scope of the invention. Accordingly, the following embodiments of the invention are set forth without any loss of generality to, and without imposing limitations upon, the claimed invention.

In this detailed description of the present invention, a person skilled in the art should note that directional terms, such as "above," "below," "upper," "lower," and other like terms are used for the convenience of the reader in reference to the drawings. Also, a person skilled in the art should notice this description may contain other terminology to convey position, orientation, and direction without departing from the principles of the present invention.

Furthermore, in this detailed description, a person skilled in the art should note that quantitative qualifying terms such as "generally," "substantially," "mostly," and other terms are used, in general, to mean that the referred to object, characteristic, or quality constitutes a majority of the subject of the reference. The meaning of any of these terms is dependent upon the context within which it is used, and the meaning may be expressly modified.

Figure 1:
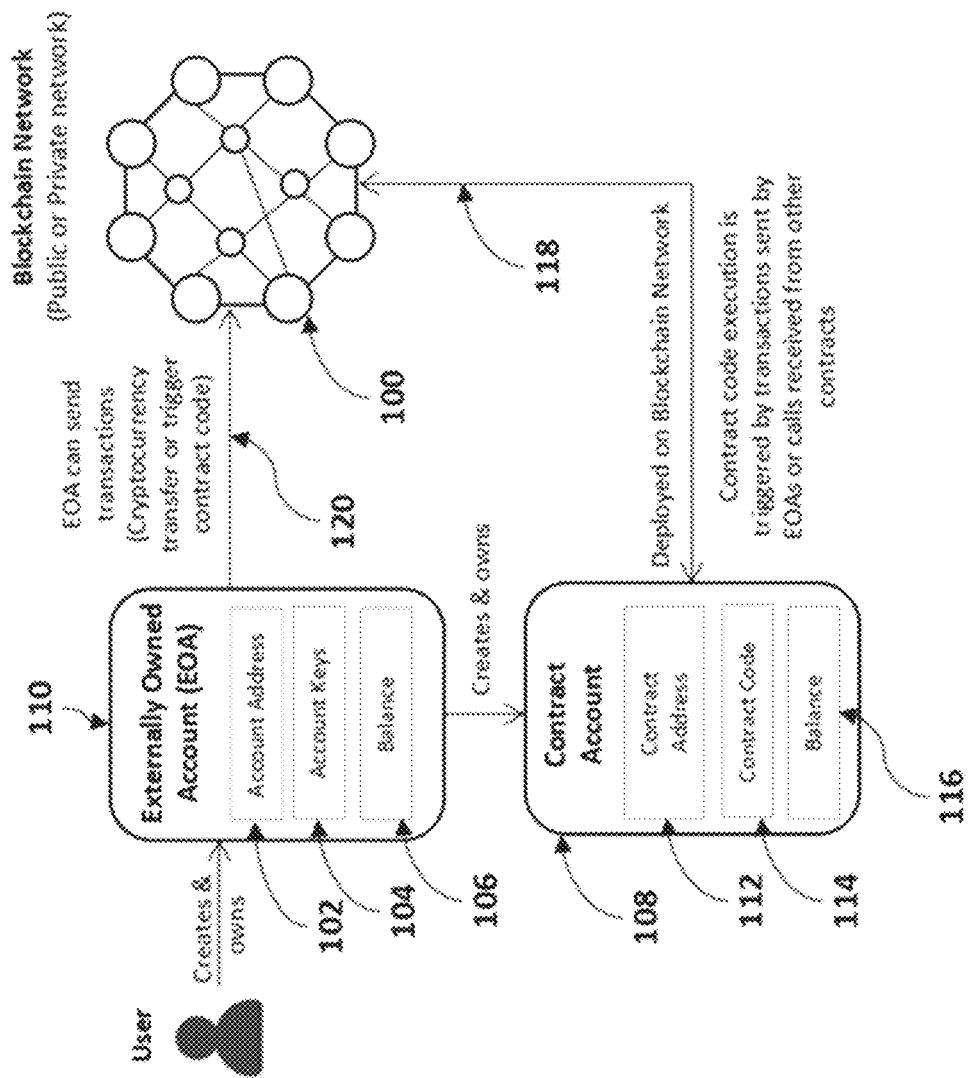
FIG. 1 is an illustration of the blockchain account types and interactions.

Referring now to FIG. 1, for example, and without limitation, blockchain account types and interactions between them, are described in more detail. Blockchain is a distributed and public ledger which maintains records of all the transactions. A blockchain network 100 is a truly peer-to-peer network and it does not require a trusted central authority or intermediaries to authenticate or to settle the transactions or to control the network infrastructure. Users can interact and transact with the blockchain networks through Externally Owned Account (EOAs) 110, which are owned and controlled by the users. Each EOA 110 has an account address 102, account public-private keys 104 and a balance 106 (in certain units of a Cryptocurrency associated with the Blockchain network) associated with it. EOAs do not have any associated code. All transactions 120 on a blockchain network are initiated by EOAs. These accounts can send transactions to other EOAs or contract accounts. Another type of accounts support by second generation programmable Blockchain platforms are the Contract Accounts 108. A Contract Account 108 is created and owned by an EOA 110, is located at a contract address 112, and is controlled by the associated contract code 114 which is stored with the contract account 108. Additionally, the contract account 108 may comprise a balance 116, which may be identical to the balance 106 of the EOA 110. The contract code 114 execution is triggered by transactions 118 sent by EOAs or messages sent by other contracts.

Figure 2:
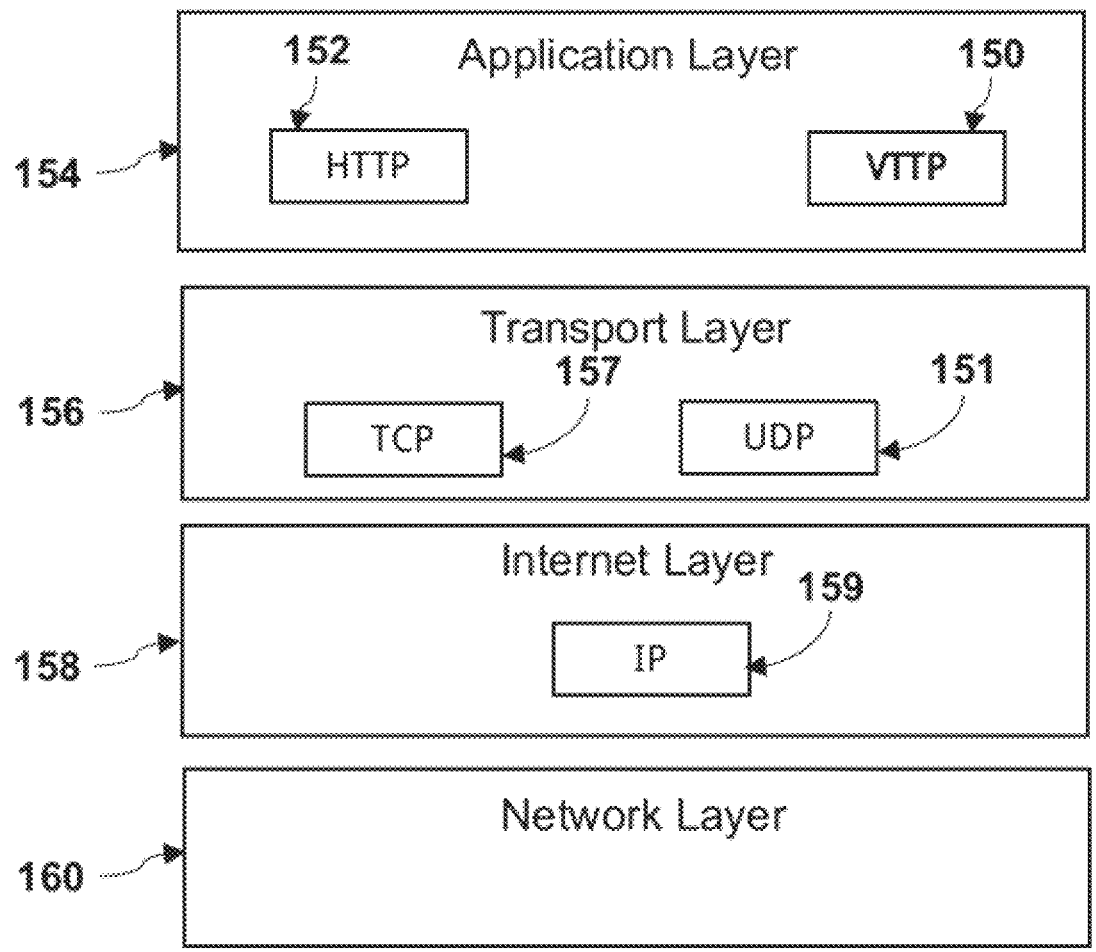
FIG. 2 is an illustration of the TCP/UDP/IP reference model layers with the VTTP protocol as part of the application layer, according to an embodiment of the invention.

Referring now to FIG. 2, the TCP/IP reference model layers with the VTTP protocol 150 as part of an application layer 154, is described in more detail. VTTP 150 is an application layer protocol and works alongside Hypertext Transfer Protocol (HTTP) 152 and on top of a transport layer 156 executing Transmission Control Protocol (TCP) 157 and an Internet layer 158 executing Internet Protocol (IP) 159. While TCP is specifically recited, all other transport layer protocols as are known in the art are contemplated and included within the scope of the invention, including, but not limited to, User Datagram Protocol (UDP), SCTP (Stream Controlled Transfer Protocol), and Quick UDP Internet Connections (QUIC). Additionally, while VTTP may operate over the Internet, it is contemplated and included within the scope of the invention that VTTP may operate over any Wide Area Network (WAN), Local Area Network (LAN), Personal Area Network (PAN), cellular network, and the like. Additionally, any communication medium is contemplated and included within the scope of the invention, including, but not limited to, Ethernet, fiber optical communication, cable communication, wireless communication (including radio, visible light, microwave, and any other electromagnetic transmission) such as IEEE 802.xx standards, and any other telecommunication standard, method, or medium. Moreover VTTP may be implemented on devices operating configured to communicate with other devices, i.e., the Internet of Things (IoT).

Figure 3:
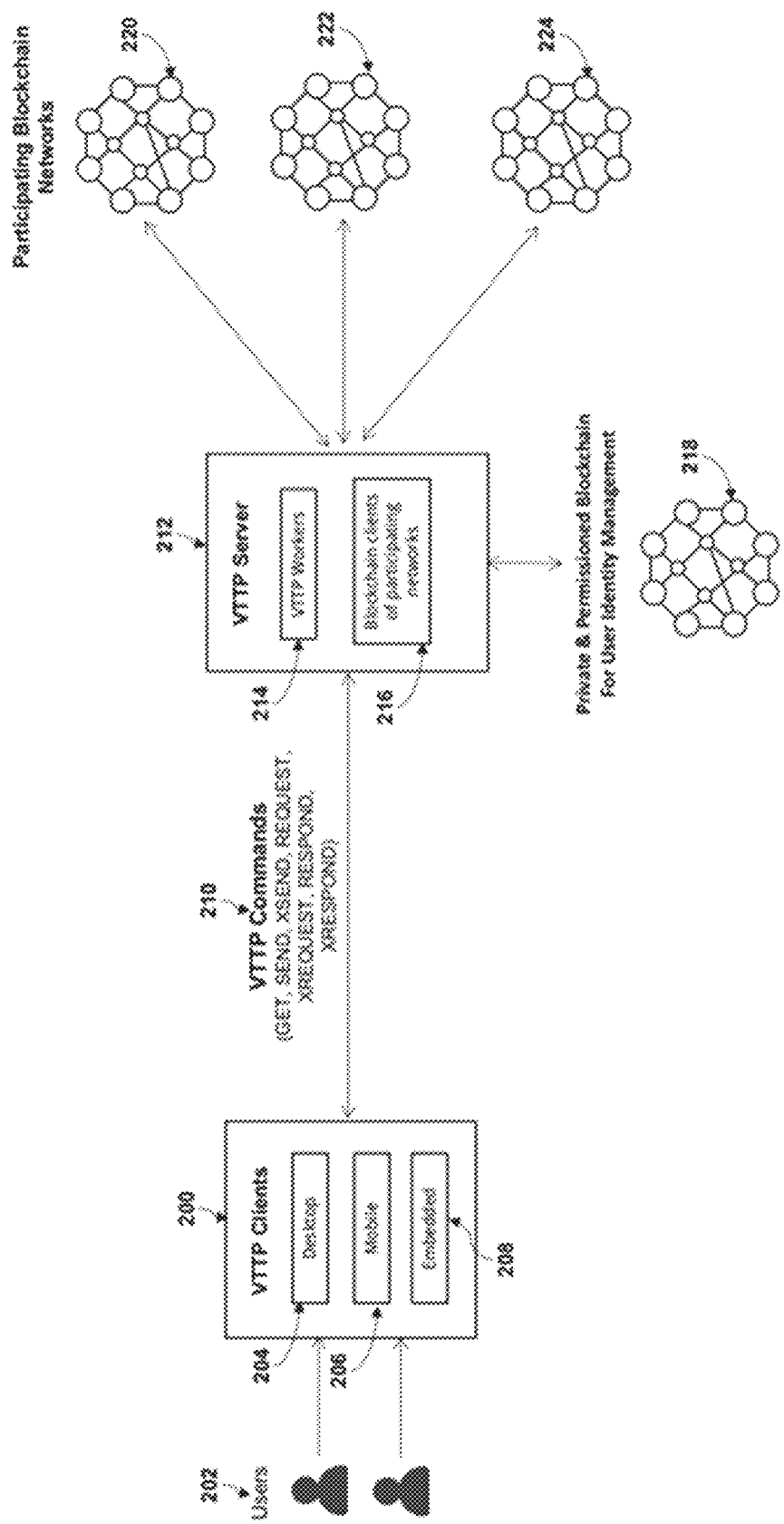
FIG. 3 is an illustration of the VTTP components, according to an embodiment of the invention.

Referring now to FIG. 3, the components of the Value Token Transfer Protocol (VTTP), are described in more detail. In one embodiment, VTTP works as a request-response protocol based on a client-server architecture, where a VTTP client 200 sends requests to a VTTP Server 212, and the server responds to the requests. The VTTP clients 200 may be available for different platforms and devices such as a desktop client 204, a mobile client 206 or an embedded client 208. Users 202 send VTTP requests to the VTTP server 212 using VTTP clients 200. VTTP requests contain VTTP commands 210 which are processed by the VTTP server 212. A VTTP server 212 may have one or more VTTP Workers 214 to process VTTP requests and execute the VTTP commands 210 sent by VTTP clients 200. VTTP server 212 has blockchain clients 216 for each of the participating blockchain networks 220, 222, 224.

A separate blockchain network 218 may be may be used for user identity and access management. The identity information of each user may be maintained on a separate blockchain network. An identity verification and certification procedure is performed for securely linking blockchain accounts to real users. The identity (and associated blockchain accounts) of each user may be separately verified through an identity verification process. A system and associated methods for securely linking blockchain accounts to real users, as described in related U.S. patent application Ser. No. 15/863,128 titled Method and System for Blockchain-Based Combined Identity, Ownership and Custody Management filed Jan. 5, 2018, the content of which is incorporated herein by reference except to the extent disclosure therein is inconsistent with disclosure herein. A user identity registration and certification procedure is performed that comprises receiving hashed user identification information that has been signed with a private key of the user from the user, defining a seal contract, generating an address of the seal contract, defined as a sealed user record address, and providing the sealed user record address. The procedure may further comprise receiving a hashed verification record from a certificate authority, generating an address of a verification contract from the hashed verification record, defined as a sealed verification record address and providing the sealed verification record address. Furthermore, the procedure may further comprise generating a certification contract from a combination of the sealed user record address, a certification token, and the sealed verification record address, providing a certification contract address, receiving a verification record by a certification authority comprising the hashed user identification information and a token, and receiving a combination of the certification contract address and the seal contract, defining a received certification contract address and a received seal contract, respectively. Additionally, the procedure may further comprise obtaining each of the sealed user record address and the sealed verification record address from the certification contract address, retrieving the seal contract from the sealed user record address, defining a retrieved seal contract, decrypting the retrieved seal contract using a public key associated with the user, defining a decrypted retrieved seal contract, and comparing the decrypted retrieved seal contract and the received seal contract. Yet further, the procedure may comprise retrieving the verification contract from the sealed verification record address, defining a retrieved verification contract, obtaining a certification token from the certification contract address, generating a hashed confirming verification record by hashing the combination of the decrypted retrieved seal contract and the certification token, and comparing the hashed confirming verification record to the retrieved verification contract. Upon a comparison of the decrypted retrieved seal contract and the received seal contract indicating they are at least a partial match and the comparison of the hashed confirming verification record to the retrieved verification contract indicating they are at least a partial match, a session certification token for a decentralized application may be generated. Finally, the procedure may comprise transmitting the session certification token to the user.

Figure 4:
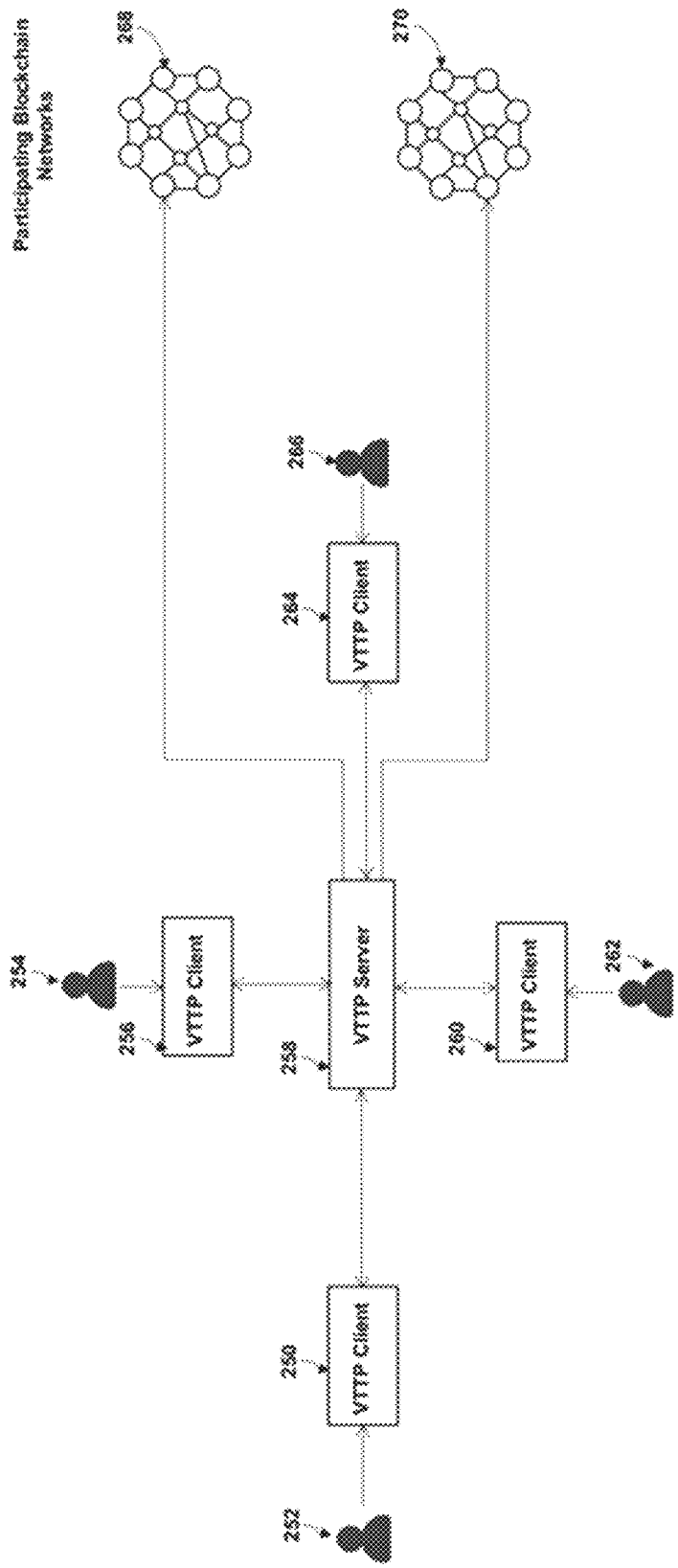
FIG. 4 is an illustration of the VTTP client-server model, according to an embodiment of the invention.

Referring now to FIG. 4, the VTTP client-server model, is described in more detail. In the client-server model, VTTP works as a request-response protocol based on a client-server architecture, where VTTP clients 250, 256, 260, 264 send requests to a VTTP server 258, and the server responds to the requests. The server processes the VTTP requests and generates and sends transactions to the participating blockchain networks 268, 270 to execute a value transfer.

Figure 5:
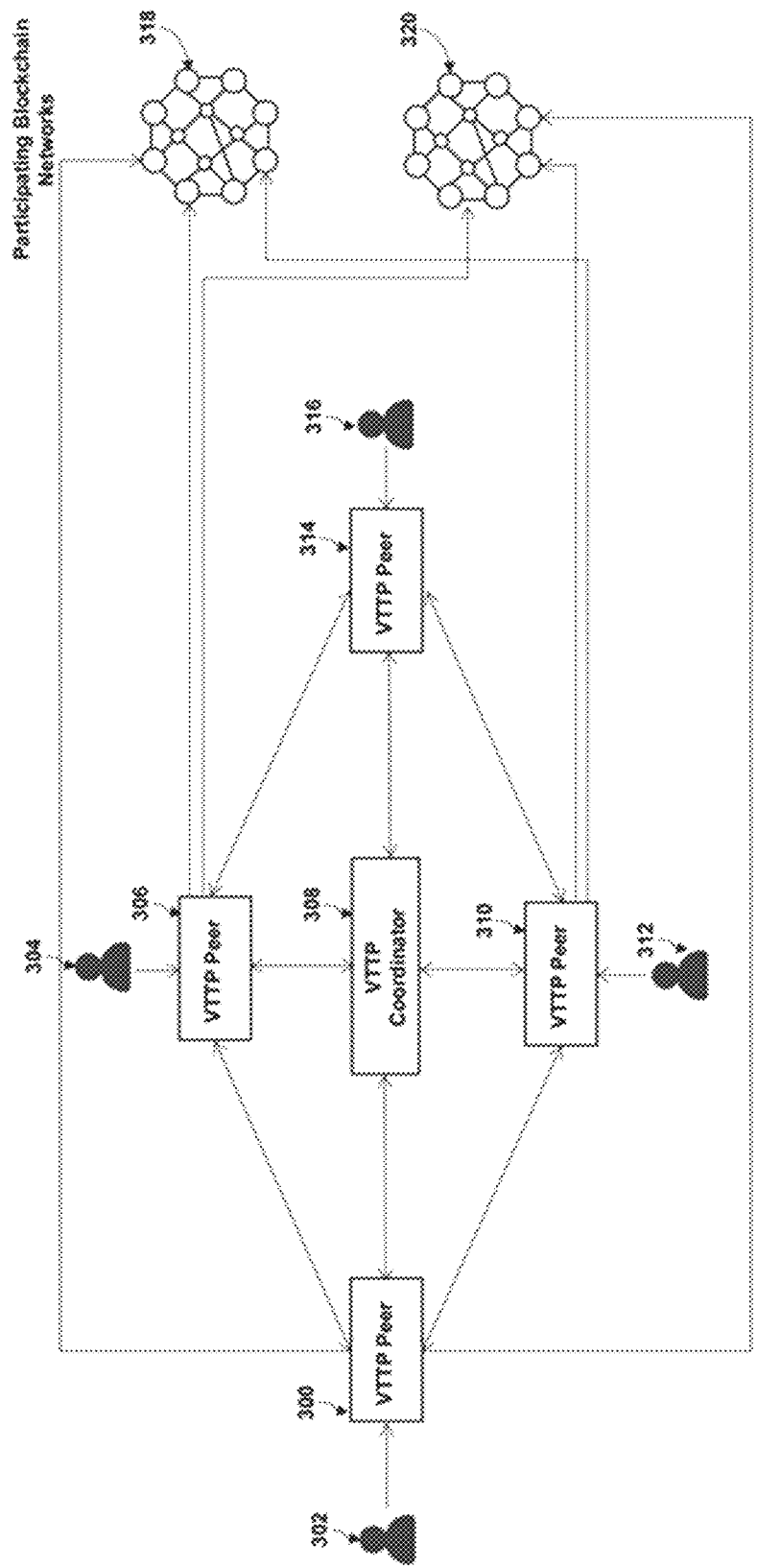
FIG. 5 is an illustration the VTTP peer-to-peer model, according to an embodiment of the invention.

Referring now to FIG. 5, the VTTP peer-to-peer model, is described in more detail. In the peer-to-peer model, VTTP works as a peer-to-peer protocol where VTTP peers 300, 306, 310, 314, operated by respective users 302, 304, 312, 316, communicate directly with their peers and a VTTP coordinator 308 may be used for coordinating the communication between peers. VTTP peers 300, 306, 310, 314 generate and send transactions to the participating blockchain networks 268, 270 to execute a value transfer on blockchain networks 318, 320.

Figure 6:
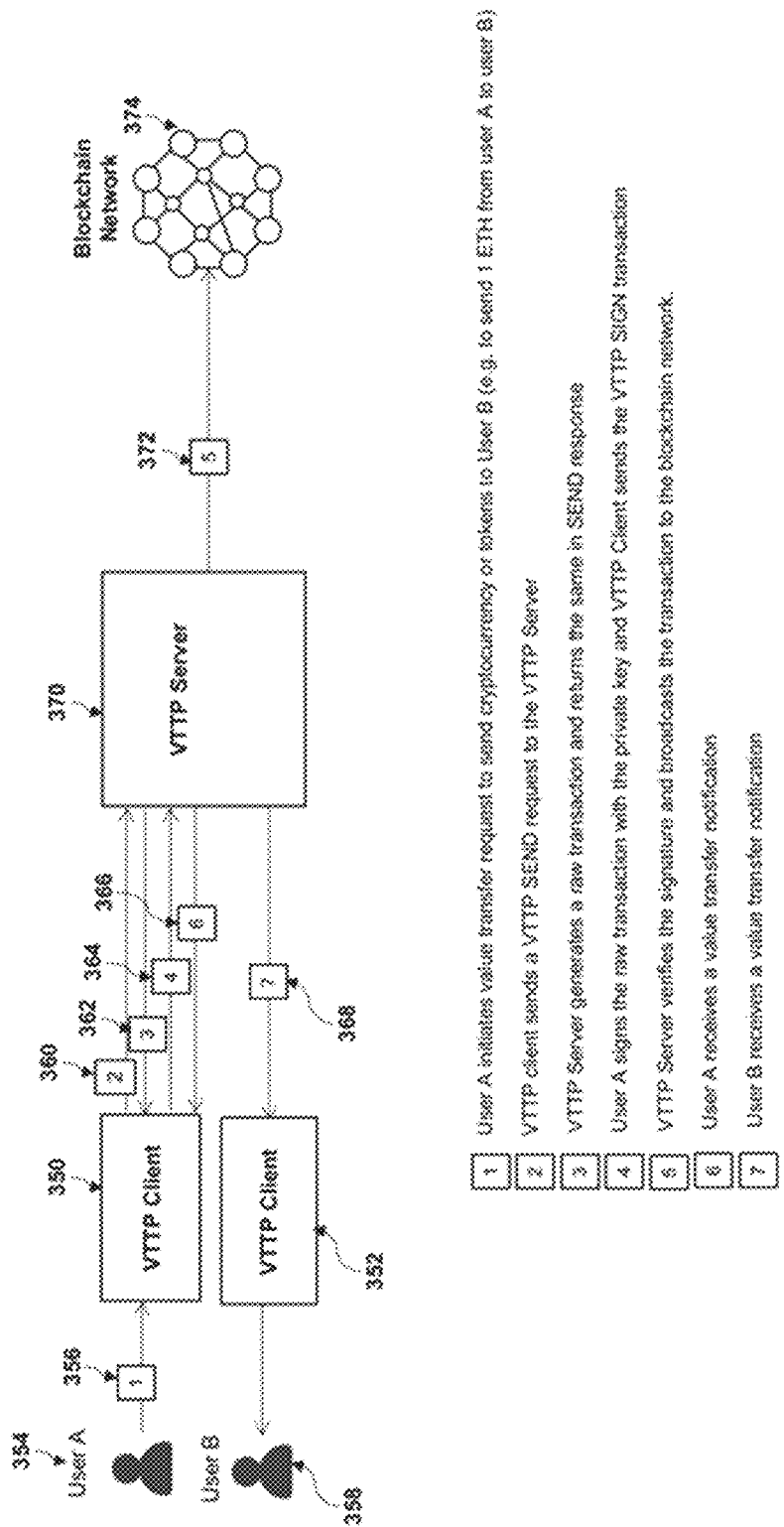
FIG. 6 is an illustration of the VTTP intra-chain value transfer process, according to an embodiment of the invention.

Referring now to FIG. 6, the VTTP intra-chain value transfer process, is described in more detail. The VTTP intra-chain value transfer process enables transfer of cryptocurrency or tokens from one account to another account on the same blockchain network. For example, consider an intra-chain value transfer request where a User A 354 wants to transfer certain units of a cryptocurrency or tokens from an account on a blockchain network 374 to the account of another User B 358 on the same blockchain network. At step 1 356, User A 354 initiates value transfer request to send cryptocurrency or tokens to User B 358 (e.g. to send 1 ETH from user A to user B). At step 2 360, the VTTP client 350 sends a VTTP SEND request to the VTTP server 370. At step 3 362, the VTTP server generates a raw transaction and returns the same in SEND response. At step 4 364, User A signs the raw transaction with the private key and VTTP client 350 sends the VTTP SIGN transaction. At step 5 372, VTTP server 370 verifies the signature and broadcasts the transaction to the blockchain network 374. At step 6 366, User A 354 receives a value transfer notification. At step 7 368, User B 358 receives a value transfer notification via VTTP Client 352.

Figure 7:
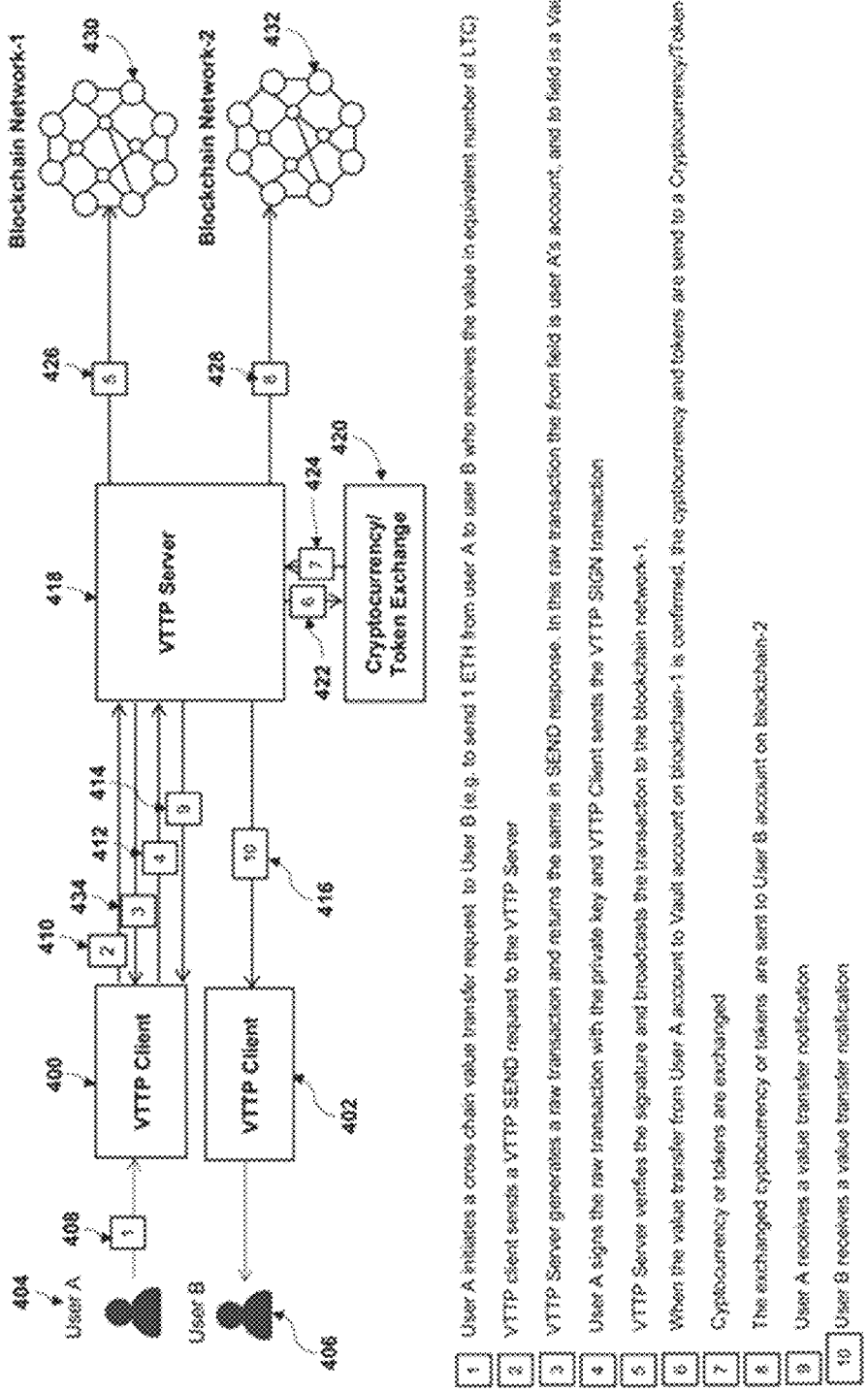
FIG. 7 is an illustration of the VTTP inter-chain value transfer process, according to an embodiment of the invention.

Referring now to FIG. 7, the VTTP inter-chain value transfer process, is described in more detail. The VTTP inter-chain value transfer process enables transfer of cryptocurrency or tokens from an account on a blockchain network to another account on a different blockchain network. At step 1 408, User A 404 initiates a cross chain value transfer request to User B 406 (e.g. to send 1 ETH from user A to user B who receives the value in equivalent number of LTC). At step 2 410, VTTP client 400 sends a VTTP SEND request to the VTTP server 418. At step 3 434, VTTP server generates a raw transaction and returns the same in SEND response. In this raw transaction the 'from' field is user A's account, and 'to' field is a 'Vault Account' on blockchain network-1 430. At step 4 412, User A 404 signs the raw transaction with the private key and VTTP client 400 sends the VTTP SIGN transaction. At step 5 426, VTTP server 418 verifies the signature and broadcasts the transaction to the blockchain network-1 430. At step 6 422, when the value transfer from User A account to Vault account on blockchain network-1 430 is confirmed, the cryptocurrency and tokens are sent to a Cryptocurrency/Token Exchange account 420. At step 7 424, cyptocurrency or tokens are exchanged. At step 8 428, the exchanged cyptocurrency or tokens are sent to User B account on blockchain network-2 432. At step 9 414, User A 404 receives a value transfer notification. At step 10 416, User B 406 receives a value transfer notification via VTTP Client 402.

Referring now to FIG. 8, VTTP commands are described in more detail. The VTTP GET command 452 is used to retrieve information about an account, contract, transaction, and an exchange rate for a token. For example, the VTTP GET command 452 to retrieve balance of an account may look as follows:

```
         GET vttp://ROOT_URL/ethereum/address/
    0x004E1A8B6d1B65C2497055e65AFC5E5A46Db750D/balance
```

The VTTP SEND command 454 is used to send value from one account to another account in same network. For example, the VTTP SEND command 454 to send ETH from one Ethereum account to another may look as follows:

```
              SEND vttp://ROOT_URL/ethereum?from=
       0x004E1A8B6d1B65C2497055e65AFC5E5A46Db750D
       &to=0x0049b1258Fd75C021d99E2109323Daa0E9ae8a6A&value=1
```

A VTTP SEND command 454 to send ERC20 token ABC from account A and receive ERC20 token XYZ in account B may look as follows:

```
              SEND vttp://ROOT_URL/ethereum?from=
       0x004E1A8B6d1B65C2497055e65AFC5E5A46Db750D
       &to=0x0049b1258Fd75C021d99E2109323Daa0E9ae8a6A
       &source=ABC&destination=XYZ&
       &sourceContract=
       0x4891B15e2942FD4c176E4f2Ae3faF281E26EE466
              &destinationContract=
       0x2fF2159D77805d489F6347BbEa3067Efb13d3176&value=1
```

The VTTP XSEND command 456 is used to send value from one account to another account in another network. For example, the VTTP XSEND command 456 to send ETH from an Ethereum account and receive LTC in a Litecoin account may look as follows:

```
         XSEND vttp://ROOT_URL/ethereum/litecoin?
    from=0x004E1A8B6d1B65C2497055e65AFC5E5A46Db750D
         &to=LWhC2FmafKgDbqT129rB8Yj3dB9FVGhA2E
         &source=ETH&destination=LTCvalue=1
```

The VTTP REQUEST command 458 is used to request value from an account in the same network. For example, the VTTP REQUEST command 458 to request ETH from an Ethereum account may look as follows:

```
            REQUEST vttp://ROOT_URL/ethereum?
    from=0x004E1A8B6d1B65C2497055e65AFC5E5A46Db750D
                        &to=
         0x0049b1258Fd75C021d99E2109323Daa0E9ae8a6A&value=
                         1
```

The VTTP XREQUEST command 460 is used to request value from an account in another network. For example, the VTTP XREQUEST command 460 to request LTC from a Litecoin account and receive ETH in Ethereum account may look as follows:

```
         XREQUEST vttp://ROOT_URL/ethereum/litecoin?
    from=0x004E1A8B6d1B65C2497055e65AFC5E5A46Db750D
         &to=LWhC2FmafKgDbqT129rB8Yj3dB9FVGhA2E
         &source=LTC&destination=ETH&value=1
```

The VTTP RESPOND command 462 is used to accept or deny a request received from an account in the same network. For example, the VTTP RESPOND command 462 to accept a value transfer request within Ethereum network may look as follows:

RESPOND vttp://ROOT_URL/ethereum?reqid=132376876 &status=accept

Similarly, the VTTP RESPOND command 462 to deny a value transfer request within Ethereum network may look as follows:

RESPOND vttp://ROOT_URL/ethereum?reqid=132376876 &status=deny

The VTTP XRESPOND command 464 is used to accept or deny a request received from an account in another network. For example, the VTTP XRESPOND command 464 to accept a value transfer request from Litecoin to Ethereum network may look as follows:

XRESPOND vttp://ROOT_URL/ethereum/litecoin?reqid=63768237 &status=accept

Similarly, the VTTP XRESPOND command 464 to deny a value transfer request from Litecoin to Ethereum network may look as follows:

XRESPOND vttp://ROOT_URL/ethereum/litecoin?reqid=63768237 &status=deny

The VTTP SIGN command 466 is used to sign and approve a transaction. For example, the VTTP SIGN command 466 to sign a value transfer request may look as follows:

SIGN vttp://ROOT_URL/ethereum?Id=1827637&signature= 0xf86b0184ee6b280082520894187

Figure 9:
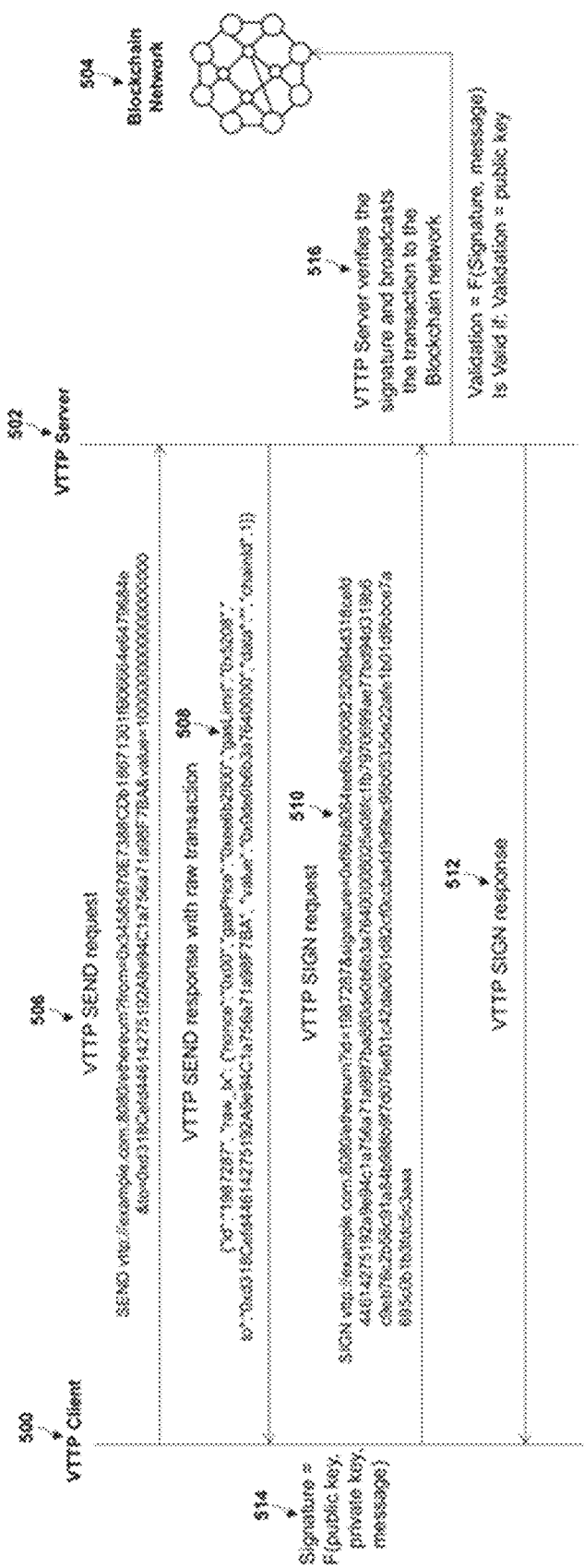
FIG. 9 is an illustration the transaction signing process in VTTP, according to an embodiment of the invention.

Referring now to FIG. 9, the transaction signing process in VTTP, is described in more detail. VTTP transactions that transfer value are signed and approved by the user on the client side. For example, to send value from one account to another account within the same blockchain network 504, the VTTP client 500 sends a VTTP SEND command at step 506. The VTTP server 502 generates the blockchain network 504 specific raw transaction and returns the raw transaction in the response at step 508. The user then signs the raw transaction with the private key 514 and sends the signed transaction with the VTTP SIGN command at step 510. The VTTP server 502 verifies the signature, broadcasts the signed transaction at step 516 to the blockchain network 504, and sends a SIGN response at step 512. With this model of signing transactions on the client side, the user can retain the private keys on the user's local machine and need not share them with the VTTP server.

Figure 10:
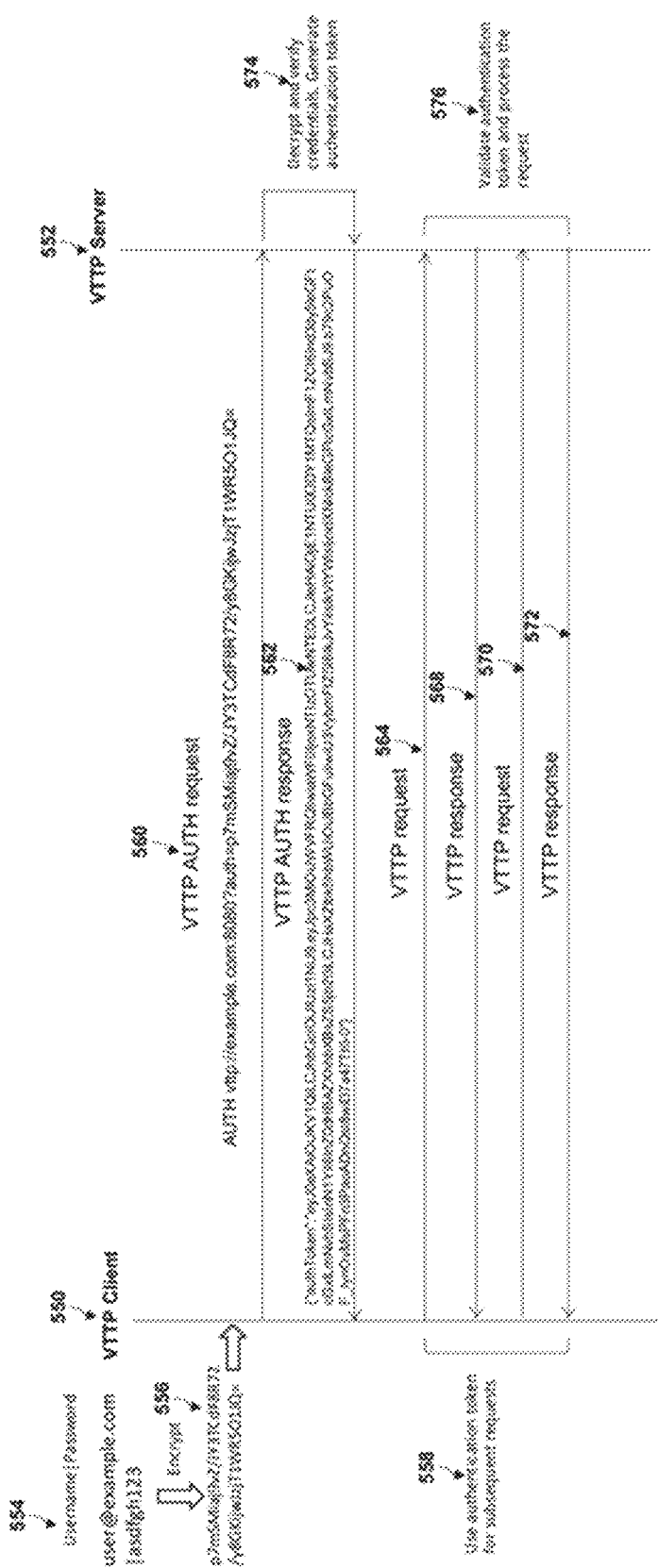
FIG. 10 is an illustration of the token-based authentication process in VTTP, according to an embodiment of the invention.

Referring now to FIG. 10, the token-based authentication process in VTTP, is described in more detail. A VTTP client 550 can authenticate with a VTTP server 552 using an authentication token which is generated by the client and verified by the VTTP server 552. VTTP may use existing authentication token standards such as JSON Web Token (JWT) (described in RFC 7519) for securely transmitting information between a client and server as a JSON object. VTTP may also support other custom token standards. An example of using JSON Web Token standard for authenticating a VTTP client 550 with a VTTP server 552 is shown in FIG. 10. At the client side, the username and password fields 554 are combined and encrypted to generate an encrypted authentication string 556. The VTTP client 550 sends a VTTP AUTH request to the VTTP server 552 containing the encrypted authentication string 556 at step 560. The VTTP server decrypts the encrypted authentication string 556 and verifies the user's credentials, and then generates a JSON Web token at step 574. A JSON Web Token contains header, payload and signature fields. The header field may specify the token type (JWT) and the signing algorithm used (such as HMAC SHA-256 algorithm). The payload field may contain registered, private and public claims. The registered claims defined in JWT include claims such as 'iss' (issuer of the token), 'sub' (subject of the token), 'aud' (audience of the token), 'exp' (token expiration time defined in Unix time), 'nbf' ('not before time' that identifies the time before which the JWT must not be accepted for processing), 'iat' ('issued at' time, in Unix time, at which the token was issued) and 'jti' (JWT ID). To create the signature part of a JSON Web Token the encoded header, the encoded payload, a secret, are signed using the algorithm specified in the header. For example if the HMAC SHA256 algorithm is used, the signature is created as follows:

```
HMACSHA256(
    base64UrlEncode(header) + "." +
    base64UrlEncode(payload),
    secret)
```

The signature is also used to verify the message wasn't changed along the way. The VTTP server 552 returns a VTTP AUTH response 562 containing the JSON Web Token. The VTTP client 550 uses this token for all subsequent VTTP requests 564, 570, and the VTTP server 552 validates the authentication token and process the VTTP requests 564, 570, then sending respective VTTP response 568, 572. When the JSON Web token expires, the VTTP client 550 sends a new AUTH request.

Figure 11:
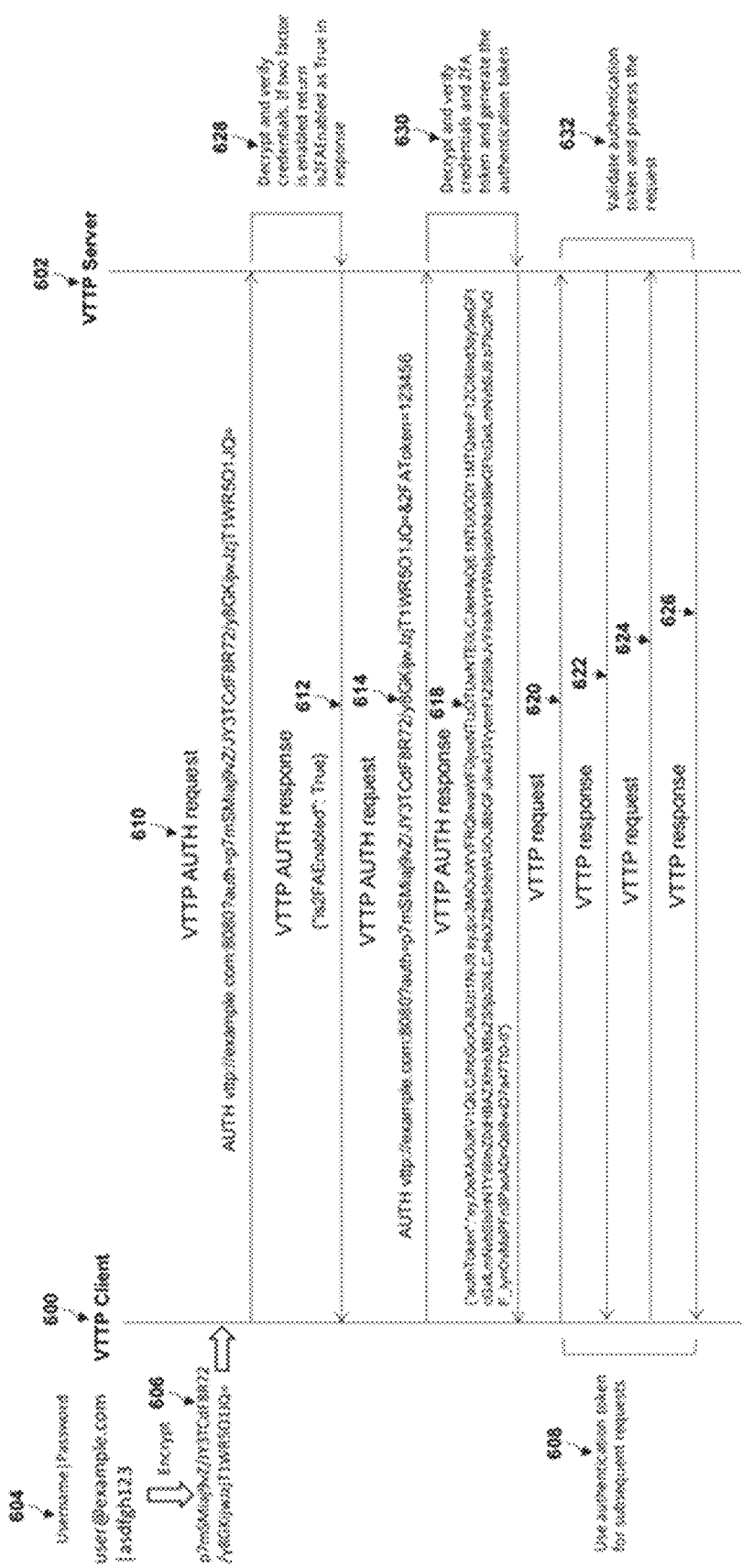
FIG. 11 is an illustration of the two-factor authentication process in VTTP, according to an embodiment of the invention.

Referring now to FIG. 11, the two-factor authentication process in VTTP, is described in more detail. VTTP supports two-factor authentication. To authenticate a VTTP client 600 with a VTTP server 602 when two-factor authentication is enabled for a user's account, the client first sends a VTTP AUTH request 610 containing an encrypted authentication string. The VTTP server 602 decrypts the authentication string and verifies the user's credentials at step 628. If two-factor is enabled for user's account, the VTTP server 602 returns 'is2FAEnabled' as 'True' in the response 612. The VTTP client 600 then sends another AUTH request 614, containing the encrypted authentication string and a two-factor authentication token. The VTTP server 602 decrypts and verifies user's credentials and two-factor authentication token and generates JSON Web Token which is used as an authentication token for all subsequent requests sent by the VTTP client 600 at step 630. The VTTP server 602 returns a VTTP AUTH response 618 containing the JSON Web Token at step 618. The VTTP client 600 uses this token for all subsequent VTTP requests 620, 624, and the VTTP server 602 validates the authentication token and process the VTTP requests 620, 624, then sending respective VTTP response 622, 626.

Figure 12:
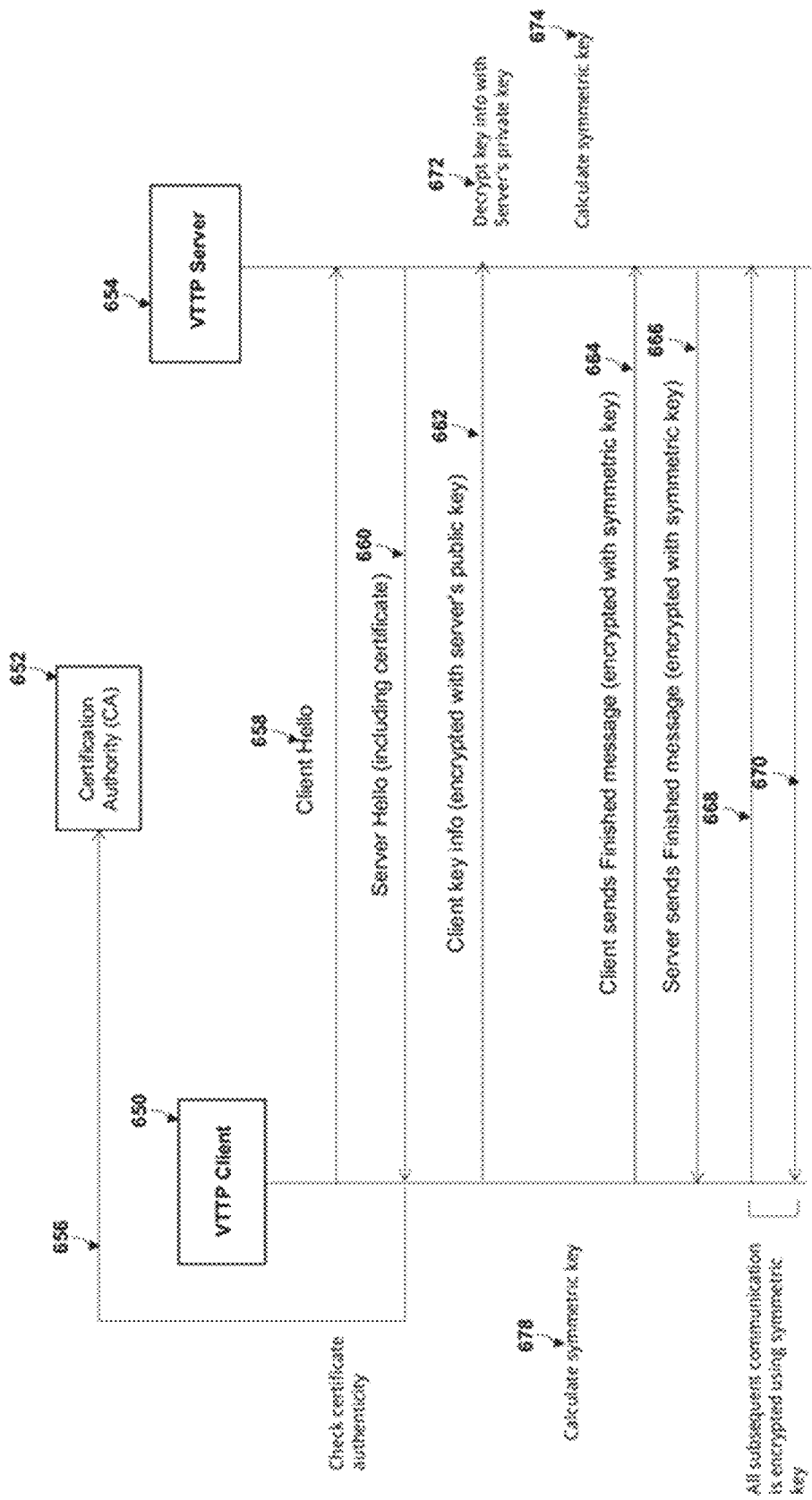
FIG. 12 is an illustration of VTTP Secure (VTTPS), a secure version of VTTP that runs over SSL/TLS, according to an embodiment of the invention.

Referring now to FIG. 12, VTTP Secure (VTTPS), a secure version of VTTP that runs over SSL/TLS, is described in more detail. The use of SSL/TLS allows an encrypted channel of communication between the client and server. A handshake process is done in which the client and server compute a symmetric key which is used to encrypt all communication during their TLS session. At step 658, a VTTP client 650 initiates a handshake by sending a Client Hello message to a VTTP server 654. At step 660, the VTTP server 654 responds with a Server Hello message and the server's certificate. At step 656, the VTTP client 650 authenticates the server's identity by verifying the server certificate with a certificate authority 652. At step 662, the VTTP client 650 sends a key-info containing a random string of data to the server (which is encrypted with the server's public key). After this step the VTTP client 650 and the VTTP server 654 each have the random string of data which is used to calculate (independently) the symmetric key that will be used to encrypt all remaining communication for the duration of that specific TLS session, such calculations being performed at steps 678 and 674, respectively. The VTTP client 650 and the VTTP server 654 then both send respective "Finished' messages that have been encrypted with the symmetric key at the end of the handshake at steps 664 and 666. All subsequent communication 668, 670 between the VTTP client 650 and the VTTP server 654 may be encrypted using the symmetric key.

Figure 13:
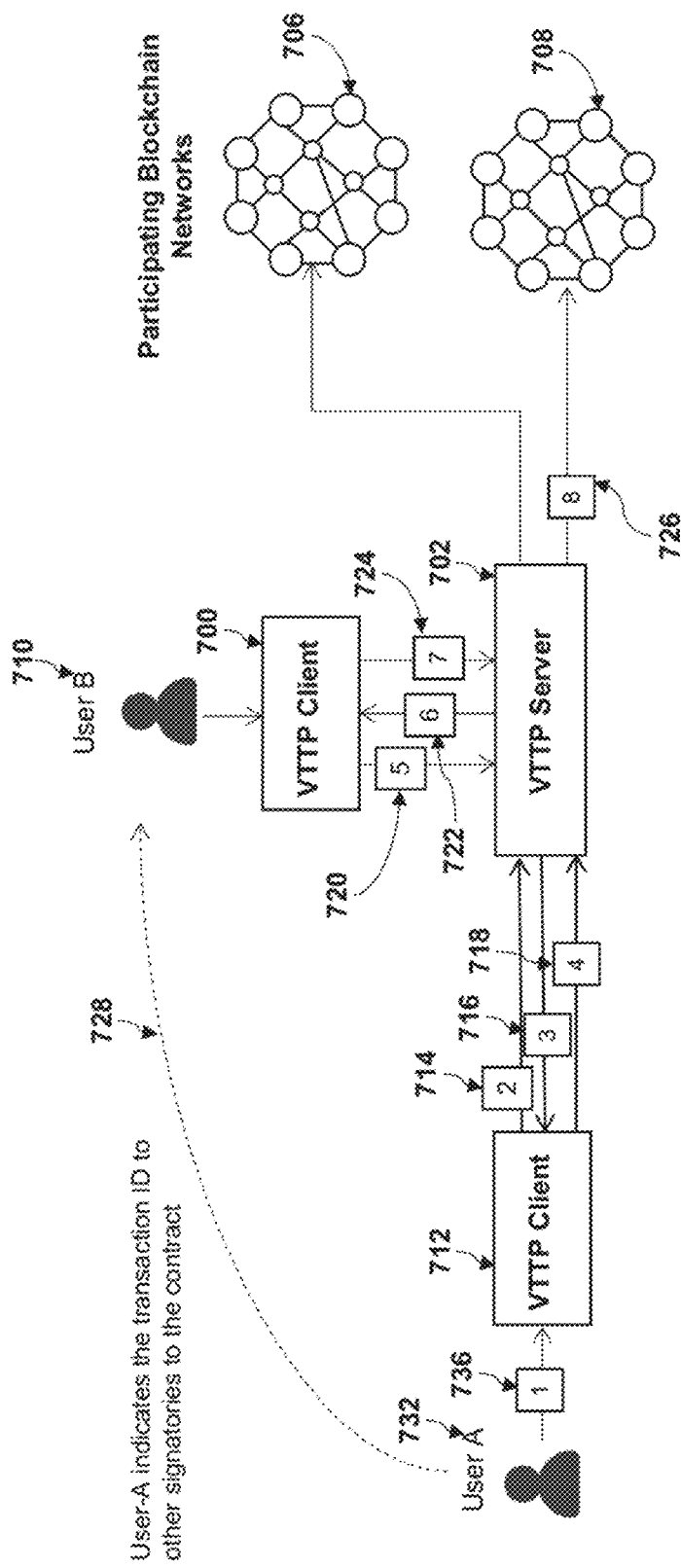
FIG. 13 is an illustration the multi-signature transaction signing process in VTTP, according to an embodiment of the invention.

Referring now to FIG. 13, the multi-signature ("multisig") transaction signing process in VTTP, is described in more detail. The FIG. 13 shows an example of using VTTP for a multisig contract that requires 2 out of 3 signatures to process a transaction. At step 1 736, User A 732 initiates value transfer request to send cryptocurrency or tokens. At step 2 714, VTTP client 712 sends a VTTP SEND request to the VTTP server 702. At step 3 716, VTTP server 702 generates a raw transaction and returns the same in SEND response. At step 4 718, User A 732 signs the raw transaction with the private key and VTTP client 712 sends the VTTP SIGN transaction. At step 728, User A 732 may indicate the transaction ID to other signatories to the contract or other signatories may get a notification from the VTTP server 702. At step 5 720, User-B 710 retrieves the transaction using the transaction ID. At step 6 722, VTTP server 702 returns the raw transaction to be signed by User B 710. At step 7 724, User B-710 signs the raw transaction with the private key and VTTP client 700 sends the VTTP SIGN transaction. At step 8 726, VTTP server 702 verifies the signatures of User A 732 and User B 710 and broadcasts the transaction to a blockchain network 708.

Figure 14:
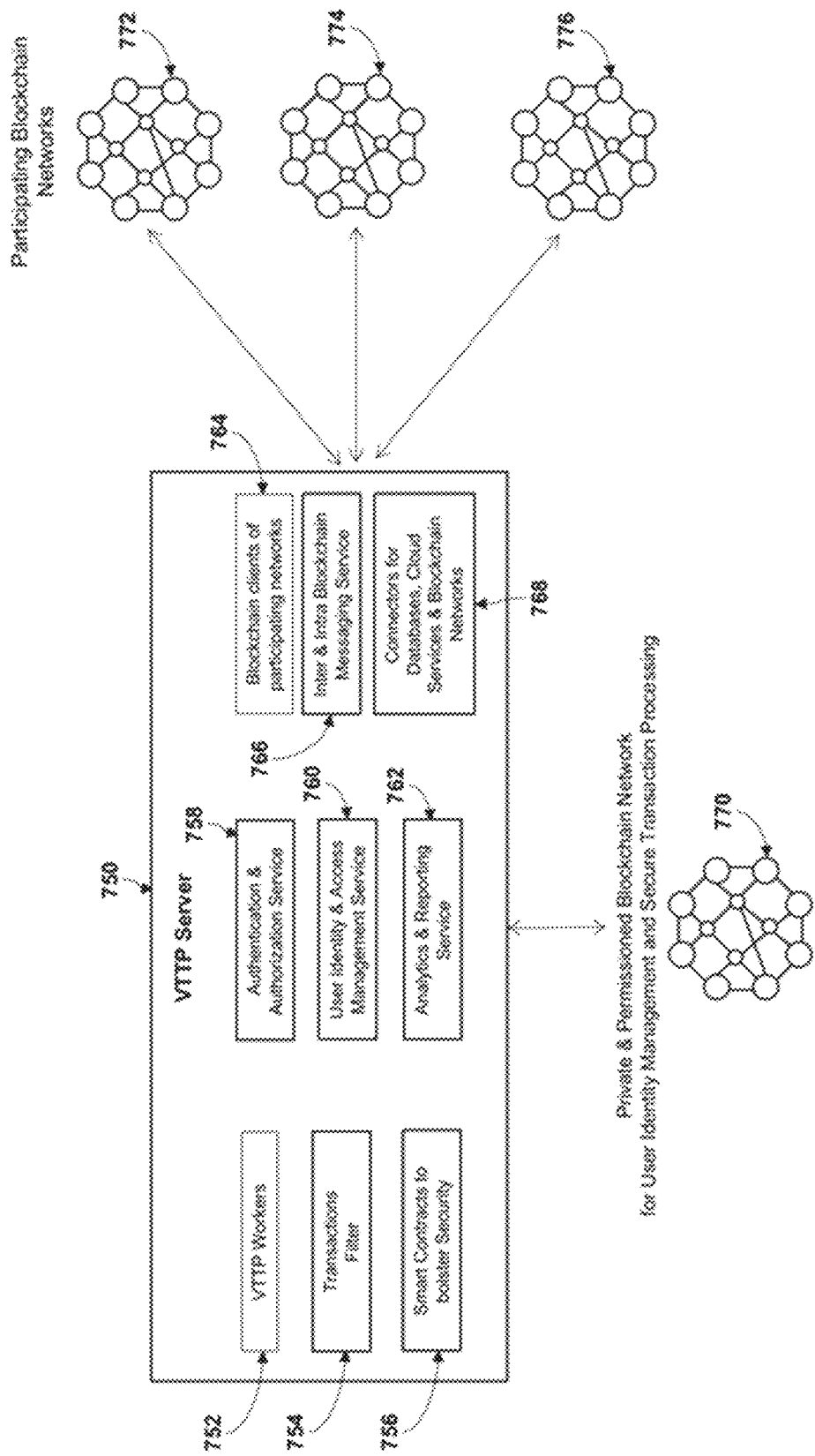
FIG. 14 is an illustration an exemplary VTTP server architecture, according to an embodiment of the invention.

Referring now to FIG. 14, an exemplary VTTP server architecture, is described in more detail. A VTTP server 750 may have one or more VTTP Workers 752 to process VTTP requests and execute the VTTP commands sent by VTTP clients. VTTP server 750 has blockchain clients 764 for each of the participating blockchain networks 772, 774, 776. A separate blockchain network 770 may be may be used for user identity and access management. The VTTP server 750 may contain additional services, such as User Identity & Access Management Service 760, Authentication & Authorization Service 758, and Analytics & Reporting Service 762. The VTTP server 750 may contain inter- and intra-blockchain messaging services 766 and connectors for databases, cloud services & blockchain networks 768. A transactions filter 754 may be used in the server to filter transactions. The server may use various Smart Contracts 756 to bolster security. These smart contracts may be executed for each VTTP request and perform additional verification (such as verifying sender and receiver's address). The smart contracts may enforce checks such as time limits or quantity restrictions. Some smart contracts may perform functions similar to virus filters, for filtering out suspicious transactions. New smart contracts can be distributed to VTTP servers in a manner similar to virus updates.

Figure 15:
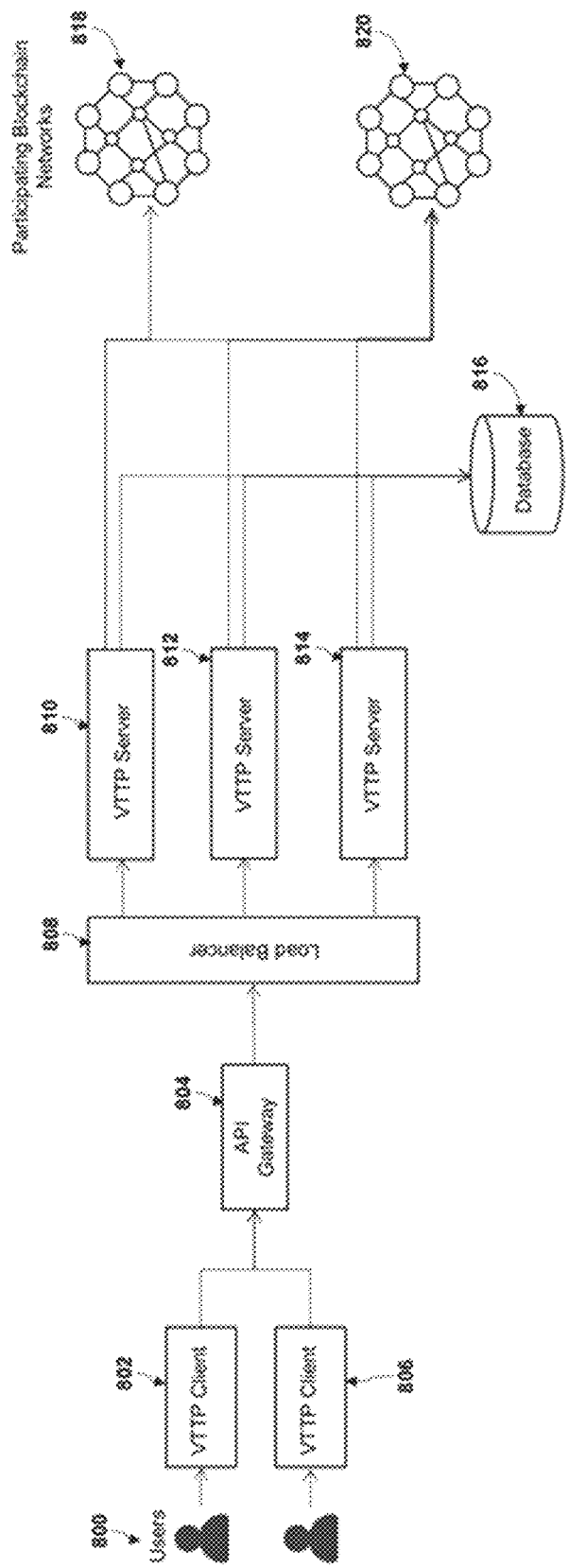
FIG. 15 is an illustration an exemplary VTTP reference architecture, according to an embodiment of the invention.

Referring now to FIG. 15, an exemplary VTTP reference architecture, is described in more detail. Users 800 may use VTTP clients 802, 806 to communicate with VTTP servers 810, 812, 814 through an API gateway 804. The VTTP servers 810, 812, 814 sit under a load balancer 808 and expose a number API endpoints. The API gateway 804 makes these APIs available to the VTTP clients. Each API has an endpoint (for example, vttp://example.com/ethereum) and a set of VTTP methods or commands which are supported for the endpoint (such as GET, SEND, REQUEST, etc.). The API gateway 804 may use an API key to enable authentication for APIs. The API gateway 804 may also perform additional functions such as logging each API request and rate-limiting of requests. A separate relational (SQL) or non-relational (NoSQL) database 816 may be used to store data such as user credentials and application specific data. Each VTTP server is connected to all the participating blockchain networks 818, 820.

Referring now to FIG. 16, VTTP status codes 850 are described in more detail. The status code '1xx' 852 is used to signal that a request has been received. For example, a value transfer request is received and is being processed. The status code '2xx' 854 is used to signal that a requested action has been successfully completed. The status code '3xx' 856 is used to signal that a VTTP command has been accepted, but the requested action is being held in abeyance, pending receipt of further information. The status code '4xx' 858 is used to signal that a VTTP command was not accepted due to a client error and the requested action did not take place. The status code '5xx' 860 is used to signal that a VTTP command was not accepted due to a server error and the requested action did not take place.

Some of the illustrative aspects of the present invention may be advantageous in solving the problems herein described and other problems not discussed which are discoverable by a skilled artisan.

While the above description contains much specificity, these should not be construed as limitations on the scope of any embodiment, but as exemplifications of the presented embodiments thereof. Many other ramifications and variations are possible within the teachings of the various embodiments. While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

Thus the scope of the invention should be determined by the appended claims and their legal equivalents, and not by the examples given.

That which is claimed is:

1. A blockchain value transfer method comprising receiving from a sending client a request to transfer value in a form of at least one of a cryptocurrency and a token at a network communication device, defining a transfer request, the transfer requesting being one of intra-chain defining a combined sending and receiving blockchain network, and inter-chain defining a sending blockchain network and a receiving blockchain network;
  transmitting to the sending client a response to the transfer request, the response comprising a raw transaction using the network communication device, the raw transaction being intra-chain if the transfer request is intra-chain and inter-chain if the transfer request is inter-chain;
  receiving from the sending client a response to the raw transaction wherein a private key of a user is used to sign the raw transaction at the network communication device, defining a signed transaction, the signed transaction being intra-chain if the raw transaction is intra-chain and inter-chain if the raw transaction is inter-chain;
  verifying a signature of the signed transaction using the processor; broadcasting, using the network communication device, the signed transaction to the combined sending and receiving blockchain network if the signed transaction is intra-chain or to the sending blockchain network if the signed transaction is inter-chain; and
  where the signed transaction is inter-chain:
  receiving a value transfer at the network communication device responsive to the broadcasting of the signed transaction from an account associated with the sending client on the sending blockchain network at a first blockchain client for the sending blockchain network;
  sending the content of the value transfer to an exchange using the network communication device;
  receiving an exchanged value transfer from the exchange at the network communication device; and
  sending the exchanged value transfer using the network communication device to an account associated with a receiving user on the receiving blockchain network from a second blockchain client for the receiving blockchain network.

2. The method according to claim 1 wherein the transfer request comprises an identification of the sending blockchain network, an indication of the receiving blockchain network, and a value indication.

3. The method according to claim 2 wherein the indication of the receiving blockchain network is an identification of a receiving blockchain network other than the blockchain network identified as the sending blockchain network for an interchain request and an absence of identification of a receiving blockchain network for an intra-chain request.

4. The method according to claim 1 wherein verifying the signature of the signed transaction comprises receiving verification of the signature of the signed transaction from a user identity and access management blockchain network.

5. The method according to claim 1 wherein client credentials are stored on a client credential database, the method further comprising authenticating the sending client by an authentication process, the authentication process comprising:
  receiving an authentication request comprising an encrypted authentication string from the sending client at the network communication device;
  decrypting the encrypted authentication string to extract extracted client credentials using the processor;
  verifying the extracted client credentials within the client credential database using the processor;
  generating an authentication token responsive to the client credentials using the processor; and
  transmitting the authentication token to the sending client using the network communication device.

6. The method according to claim 5 further comprising:
  determining the extracted client credentials require li-wo-factor authentication using the processor;

transmitting to the sending client an indication that the extracted client credentials require two-factor authentication using the network communication device;

receiving a second authentication request comprising a second encrypted authentication string and a two-factor authentication token at the network communication device;

decrypting the second encrypted authentication string from the second authentication request to extract a second extracted client credentials using the processor; and verifying the two-Factor authentication token within the client credential database using the processor.

7. The method according to claim 1 wherein the transfer request is a multisignature transfer request; wherein the raw transaction is a multisignature raw transaction; wherein a plurality of multisignature raw transactions is stored and accessible on a multisignature raw transaction database, each multisignature raw transaction stored on the multisignature raw transaction database comprising a transaction identification (ID), the method further comprising:

receiving a transfer request comprising a received transaction ID from a requestor at the network communication device;

identifying at least one multisignature raw transaction stored in the multisignature raw transaction database having a transaction ID matching the received transaction ID, defining an identified multisignature raw transaction using the processor;

transmitting the identified multisignature raw transaction to the requestor using the network communication device;

receiving a response to the identified multisignature raw transaction wherein a private key of a user is used to sign the identified multisignature raw transaction, defining a signed identified multisignature raw transaction at the network communication device; and verifying a second signature of the signed identified multisignature raw transaction using the processor.

8. The method according to claim 1 further comprising:

receiving a handshake initiating transmission from the sending client at the network communication device;

transmitting a response to the handshake initiating transmission to the sending client, the response comprising a server certificate using the network communication device;

receiving a reply transmission from the sending client comprising a random data string, the transmission being encrypted with a server public key at the network communication device;

decrypting the reply transmission from the sending client using a server private key using the processor;

extracting the random data string from the reply transmission using the processor;

calculating a symmetric key from the random data string using the processor; receiving a finish transmission from the client indicating the sending client has calculated the symmetric key at the network communication device; and transmitting a finish transmission to the client indicating calculation of the symmetric key using the network communication device;

wherein the transmission transmitted to the sending client in response to the transfer request is encrypted with the symmetric key; and wherein each of the request to transfer value and the response to the raw transaction received from the sending client are encrypted with and decryptable using the symmetric key.

9. The method according to claim 1 further comprising executing a smart contract responsive to the transfer request.

10. A blockchain value transfer method comprising:

receiving from a sending client a request to transfer value in a form of at least one of a cryptocurrency and a token at a network communication device, defining a transfer request, the transfer requesting being one of intra-chain defining a combined sending and receiving blockchain network, and inter-chain defining a sending blockchain network and a receiving blockchain network;

transmitting to the sending client a response to the transfer request, the response comprising a raw transaction using the network communication device;

receiving from the sending dent a response to the raw transaction wherein a private key of a user is used to sign the raw transaction at the network communication device, defining a signed transaction;

verifying a signature of the signed transaction using the processor; where transfer request is intra-chain, broadcasting the signed transaction to the combined sending and receiving blockchain network using the network communication device; and where the transfer request is inter-chain;

receiving a value transfer responsive at the network communication device to the broadcasting of the signed transaction from an account associated with the sending client on the sending blockchain network at a first blockchain client for the sending blockchain network;

sending the content of the value transfer to an exchange using the network communication device;

receiving an exchanged value transfer from the exchange at the network communication device; and sending the exchanged value transfer using the network communication device to an account associated with a receiving user on the receiving blockchain network from a second blockchain client for the receiving blockchain network.

11. The method according to claim 10 wherein verifying the signature of the signed transaction comprises receiving verification of the signature of the signed transaction from a user identity and access management blockchain network.

12. The method according to claim 10 wherein client credentials are stored on a client credential database, the method further comprising authenticating the sending client by an authentication process, the authentication process comprising:

receiving an authentication request comprising an encrypted authentication string from the sending client;

decrypting the encrypted authentication string to extract extracted client credentials;

verifying the extracted client credentials within the client credential database; generating an authentication token responsive to the client credentials; and transmitting the authentication token to the sending client.

13. The method according to claim 12 further comprising:

determining the extracted client credentials require two-factor authentication; transmitting to the sending client an indication the extracted client credentials require two-factor authentication;

receiving a second authentication request comprising a second encrypted authentication string and a two-factor authentication token;

decrypting the second encrypted authentication string from the second authentication request to extract a second extracted client credentials; and verifying each of the second extracted client credentials and the two-factor authentication token within the client credential database.

14. The method according to claim 10 wherein the transfer request is a multisignature transfer request; wherein the raw transaction is a multisignature raw transaction; wherein a plurality of multisignature raw transactions is stored and accessible on a multisignature raw transaction database, each multisignature raw transaction stored on the multisignature raw transaction database comprising a transaction identification (ID), the method further comprising:

receiving a transfer request comprising a received transaction ID from a requestor;

identifying at least one multisignature raw transaction stored in the multisignature raw transaction database having a transaction ID matching the received transaction ID, defining an identified multisignature raw transaction;

transmitting the identified multisignature raw transaction to the requestor;

receiving a response to the identified multisignature raw transaction wherein a private key of a user is used to sign the identified multisignature raw transaction, defining a signed identified multisignature raw transaction; and verifying a second signature of the signed identified multisignature raw transaction.

15. The method according to claim 10 further comprising:

receiving a handshake initiating transmission from the sending client;

transmitting a response to the handshake initiating transmission to the sending client, the response comprising a server certificate;

receiving a reply transmission from the sending client comprising a random data string, the transmission being encrypted with a server public key;

decrypting the reply transmission from the sending client using the server public key;

extracting the random data string from the reply transmission; calculating a symmetric key from the random data string; receiving a finish transmission from the client indicating the sending client has calculated the symmetric key; and transmitting a finish transmission to the sending client indicating calculation of the symmetric key;

wherein the transmission transmitted to the sending client in response to the transfer request is encrypted with the symmetric key; and wherein each of the request to transfer value and the response to the raw transaction received from the sending client are encrypted with and decryptable using the symmetric key.

16. The method according to claim 10 further comprising executing a smart contract responsive to the transfer request.

17. A system for executing blockchain value transfers comprising:

a processor;

a data store positioned in communication with the processor; and a network communication device positioned in communication with each of the processor, the data store, and a network;

wherein the network communication device is operable to receive from a sending client a request to transfer value in a form of at least one of a cryptocurrency and a token, defining a transfer request, the transfer requesting being one of intra-chain defining a combined sending and receiving blockchain network, and inter-chain defining a sending blockchain network and a receiving blockchain network;

wherein the network communication device is operable to transmit to the sending client a response to the transfer request, the response comprising a raw transaction, the raw transaction being intra-chain if the transfer request is intra-chain and inter-chain if the transfer request is inter-chain;

wherein the network communication device is operable to receive from the sending client a response to the raw transaction wherein a private key of a user is used to sign the raw transaction, defining a signed transaction, the signed transaction being intra-chain if the raw transaction is intra-chain and inter-chain if the raw transaction is inter-chain;

wherein the processor is operable to verify a signature of the signed transaction; wherein the network communication device is operable to broadcast the signed transaction to the combined sending and receiving blockchain network if the signed transaction is intra-chain or to each of the sending blockchain network and the receiving blockchain network if the signed transaction is inter-chain; and where the signed transaction is inter-chain, the network communication device is operable to:

receive a value transfer responsive to the broadcasting of the signed transaction from an account associated with the sending client on the sending blockchain network at a first blockchain client for the sending blockchain network; send the content of the value transfer to an exchange; receive an exchanged value transfer from the exchange; and send the exchanged value transfer to an account associated with a receiving user on the receiving blockchain network from a second blockchain client for the receiving blockchain network.

18. The system according to claim 17 further comprising a plurality of multisignature raw transactions are stored on a multisignature raw transaction database;

wherein the transfer request is a multisignature transfer request; wherein the raw transaction is a multisignature raw transaction; wherein each multisignature raw transaction stored on the multisignature raw transaction database comprises a transaction identification (ID);

wherein the network communication device is operable to receive a transfer request comprising a received transaction ID from a requestor;

wherein the processor is operable to identify at least one multisignature raw transaction stored in the multisignature raw transaction database having a transaction ID matching the received transaction ID, defining an identified multisignature raw transaction;

wherein the network communication device is operable to transmit the identified multisignature raw transaction to the requestor;

wherein the network communication device is operable to receive a response to the identified multisignature raw transaction wherein a private key of a user is used to sign the identified multisignature raw transaction, defining a signed identified multisignature raw transaction; and wherein the processor is operable to verify a second signature of the signed identified multisignature raw transaction.

19. The system according to claim 17 wherein:
the network communication device is operable to not broadcast the signed transaction to the receiving blockchain network prior to a value transfer from an account on the sending blockchain network is confirmed;
the network communication device is operable to receive a value transfer from an account on the sending blockchain network;
the network communication device is operable to send the content of the value transfer to an exchange;
the network communication device is operable to send an exchanged value transfer from the exchange; and
the network communication device is operable to transmit the exchanged value transfer to an account on the receiving blockchain network.

* * * * *

UNITED STATES PATENT AND TRADEMARK OFFICE
CERTIFICATE OF CORRECTION

| | | |
|---|---|---|
| PATENT NO. | : 10,853,772 B2 | Page 1 of 1 |
| APPLICATION NO. | : 15/976910 | |
| DATED | : December 1, 2020 | |
| INVENTOR(S) | : Vijay Madisetti and Arsdheep Bahga | |

It is certified that error appears in the above-identified patent and that said Letters Patent is hereby corrected as shown below:

In the Claims

Column 15, Line 58, Claim 1: "A blockchain value transfer method comprising receiving ..." should include a -- : -- after the word "comprising";

Column 16, Lines 12-13, Claim 1: correct "verifying a signature of the signed transaction using the processor ..." to "verifying a signature of the signed transaction using a processor ...";

Column 18, Lines 22-23, Claim 10: correct "verifying a signature of the signed transaction using the processor ..." to "verifying a signature of the signed transaction using a processor ...".

Signed and Sealed this
Eighteenth Day of March, 2025

Coke Morgan Stewart
*Acting Director of the United States Patent and Trademark Office*